US012780542B2

(12) United States Patent
Fosnight et al.

(10) Patent No.: US 12,780,542 B2

(45) Date of Patent: *Nov. 3, 2026

(54) AUTOMATIC STORAGE AND RETRIEVAL SYSTEM HAVING AUTOMATED AND SEMI-AUTOMATED ORDER DISPENSE

(71) Applicant: Symbotic LLC, Wilmington, MA (US)

(72) Inventors: William J. Fosnight, Windham, NH (US); Devin Lert, Wakefield, MA (US); John G. Lert, Wakefield, MA (US); Stephanie Waite, Boston, MA (US); Julian Warhurst, Portsmouth, RI (US); Brian Roth, Newport, KY (US); Christopher Hofmeister, Hampstead, NH (US); Mark Solomon, Lexington, MA (US)

(73) Assignee: Symbotic LLC, Wilmington, MA (US)

( * ) Notice: Subject to any disclaimer, the term of this patent is extended or adjusted under 35 U.S.C. 154(b) by 464 days.

This patent is subject to a terminal disclaimer.

(21) Appl. No.: 18/221,756

(22) Filed: Jul. 13, 2023

(65) Prior Publication Data

US 2024/0017921 A1 Jan. 18, 2024

Related U.S. Application Data

(60) Provisional application No. 63/388,874, filed on Jul. 13, 2022.

(51) Int. Cl.
*B65G 1/06* (2006.01)
*B65G 1/137* (2006.01)

(52) U.S. Cl.
CPC ........... *B65G 1/065* (2013.01); *B65G 1/1378* (2013.01)

(58) Field of Classification Search
CPC ........ B65G 1/065; B65G 1/1378; B65G 1/10; B65G 1/127; B65G 1/0492; G07F 11/62; G07F 17/13; G07F 17/10; G06Q 10/08; G06Q 10/087
USPC .......................................................... 700/216
See application file for complete search history.

(56) References Cited

U.S. PATENT DOCUMENTS

| | | | | |
|---|---|---|---|---|
| 9,139,363 | B2 | 9/2015 | Lert | |
| 10,435,241 | B2 | 10/2019 | Lert | |
| 11,142,398 | B2 | 10/2021 | Lert, Jr. | |
| 11,267,651 | B2 | 3/2022 | Fosnight | |
| 2020/0324974 | A1 * | 10/2020 | Gorman ............. | G06K 7/10415 |
| 2021/0300664 | A1 | 9/2021 | Fosnight | |
| 2022/0219904 | A1 | 7/2022 | Lert, Jr. | |
| 2023/0095494 | A1 | 3/2023 | Simpson | |
| 2024/0217744 | A1 * | 7/2024 | Almogy ............... | B65G 1/1376 |

* cited by examiner

*Primary Examiner* — Fawaad Haider
(74) *Attorney, Agent, or Firm* — Perman & Green, LLP

(57) ABSTRACT

Some embodiments provide order fulfillment systems utilized in fulfilling orders for goods. The workstation can comprise: a storage structure configured to store totes; mobile robots configured to transport the totes; a buffering station configured to receive totes from the storage structure via the mobile robots and configured to load totes into a rack; and a dispense portal appurtenant to a parking area, the dispense portal configured to receive the rack from the buffering station and configured to present totes from the rack to the parking area.

19 Claims, 20 Drawing Sheets

AUTOMATIC STORAGE AND RETRIEVAL SYSTEM HAVING AUTOMATED AND SEMI-AUTOMATED ORDER DISPENSE

CROSS-REFERENCE TO RELATED APPLICATION(S)

This application claims the benefit of U.S. Provisional Application No. 63/388,874 filed Jul. 13, 2022, which is incorporated herein by reference in their entirety.

TECHNICAL FIELD

This invention relates generally to order fulfillment.

BACKGROUND

An order fulfillment system for use in supply chains, for example in retail supply chains, may fulfill orders for individual product units or goods. Conventional systems may transfer totes including inventory using mobile robots between a storage structure and one or more picking workstations where orders are processed by a picker sequentially picking from inventory or product totes to order totes that contain eaches picked making up a given order. The order may be made up of eaches in totes or alternately in one or more containers such as plastic or paper bags, boxes or otherwise where fulfillment of the order involves dispense to the customer vehicle.

BRIEF DESCRIPTION OF THE DRAWINGS

Disclosed herein are embodiments of systems, apparatuses and methods pertaining to order fulfillment. This description includes drawings, wherein.

Figure 1:
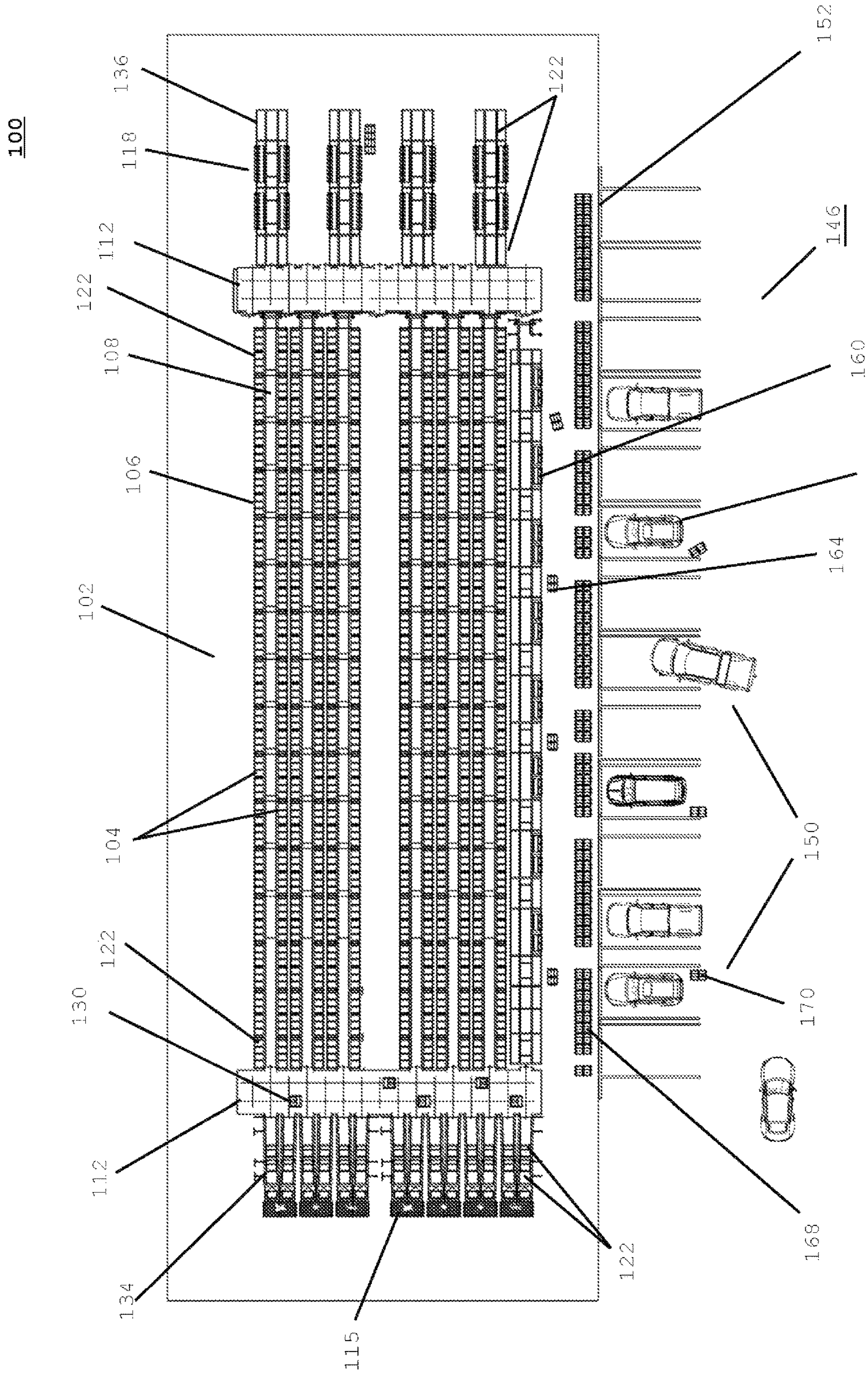
FIG. 1 shows a top view of an exemplary order fulfillment facility, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Embodiments of the present technology will now be described with reference to the figures, which in general relate to an automatic storage and retrieval system having an automated or semi-automated order dispense. The embodiments described enable a faster fulfillment time of orders, for example, by allowing an operator to stage containers local to the point of dispense. Further and as will be described, the embodiments are intended to enable more efficient use of resources as fulfillment is done in an automated or semi-automated fashion.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%.

For purposes of this disclosure, a connection may be a direct connection or an indirect connection (e.g., via one or more other parts). In some cases, when a first element is referred to as being connected, affixed or coupled to a second element, the first and second elements may be directly connected, affixed or coupled to each other or indirectly connected, affixed or coupled to each other. When a first element is referred to as being directly connected, affixed or coupled to a second element, then there are no intervening elements between the first and second elements (other than possibly an adhesive or weld used to connect, affix or couple the first and second elements).

Figure 2:
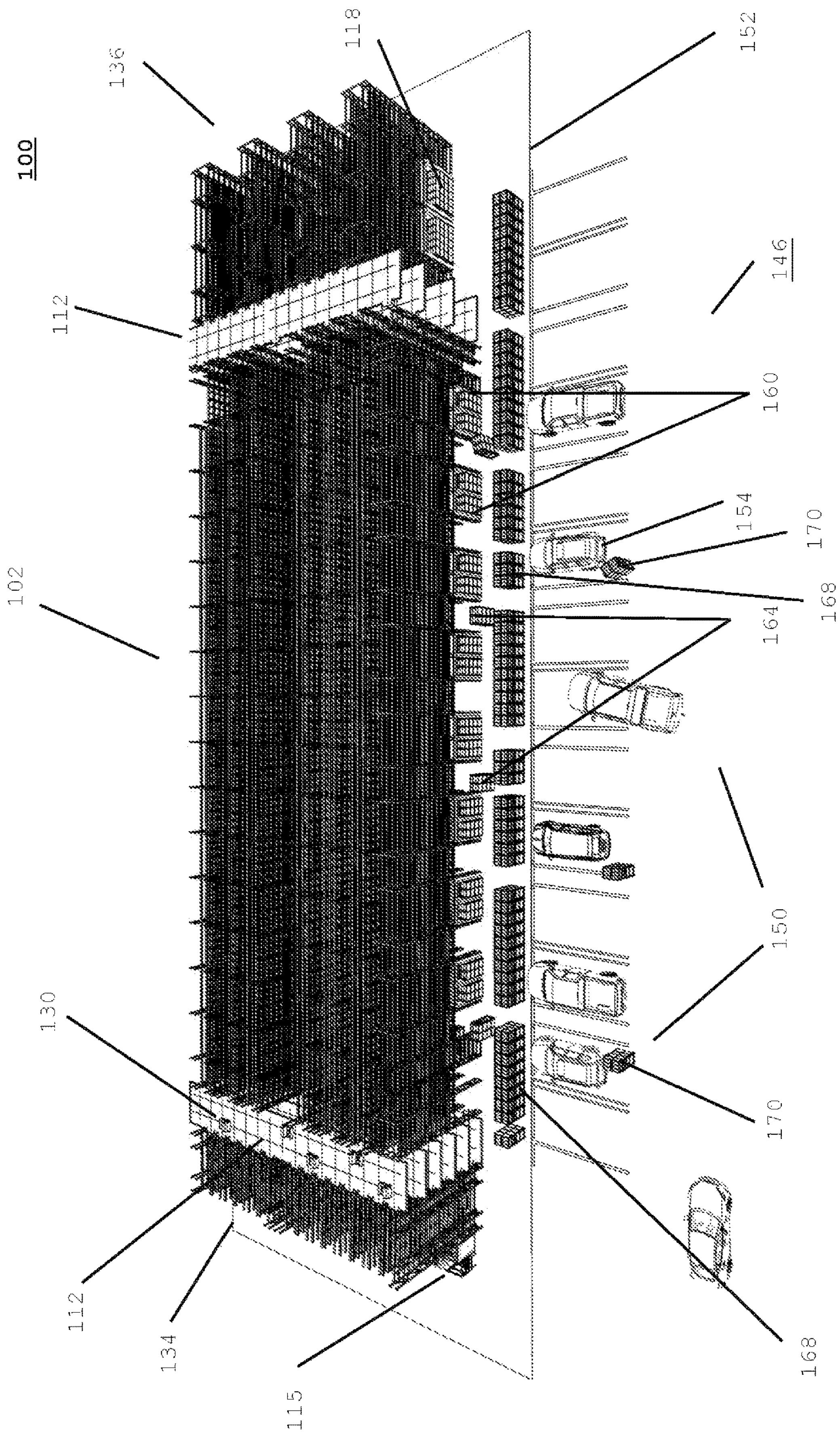
FIG. 2 shows a perspective view of an exemplary order fulfillment facility, in accordance with some embodiments.

FIG. 1 shows a top view of an exemplary order fulfillment facility 100, in accordance with some embodiments. FIG. 2 shows a perspective view of an exemplary order fulfillment facility 100, in accordance with some embodiments. Order fulfillment facility 100 has storage structure 102 including a number of bays 104 of storage locations 106. The bays 104 each include an array of storage locations 106 in horizontal rows and level changing towers along the rows which in embodiments may be vertical towers. Mobile robots 130 may travel between storage levels in the z-direction within the level changing towers. The pairs of bays 104 that are arranged to face each other, separated by aisles 108. An aisle 108 may have a width such that a mobile robot 130 traveling within an aisle 108 may transfer containers to the bays 104 on either side of the aisle 108.

The order fulfillment facility 100 includes decks 112 spaced apart at different vertical levels of the storage structure 102. The decks 112 may be arranged in pairs and extend between the aisles so that robots 130 can maneuver in the plane of each deck to travel between different aisles. One of the decks 112 or suitable supporting structure may also extend into the respective aisles to allow technicians to walk into an aisle 108 to service components within the aisle. Decks 112 may be provided for transit of Bots 130 between aisles or for transit of Bots 130 between aisles and staging and storing structures 134, 136. Staging and storing structure 134 may be provided for transit of Bots 130 between deck 112 and workstations, such as workstations 115 and also for storage of transient or other totes. Each workstation 115 is equipped to receive pairs of one or more mobile robots, for example, a first mobile robot at a station may carry a product tote, in combination with successive mobile robots with items for fulfilling product requests to make up an order. A second mobile robot at the station may carry an order tote, in combination with successive mobile robots as required, within which containers of items from the product totes are placed to fulfill product requests to make up an order having one or more order totes. The containers may be bags such as plastic or paper bags. In alternate aspects, containers may be cardboard or any suitable material. Workers at a workstation manually transfer items from a product tote to a container and/or to the order tote under guidance of an inventory control system. Staging and storing structure 136 may also be provided for transit of Bots 130 between deck 112 and workstations, such as workstations 118 and also for storage of transient or other totes. Workstations 118 may be provided to induct or remove totes and decant inventory into fulfillment facility 100. For example, workstations 118 may be as disclosed in U.S. Pat. No. 11,267,651 having patent date Mar. 8, 2022 and entitled "SYSTEM HAVING WORKSTATION WITH TOTE RETENTION AND RELEASE MECHANISM" hereby incorporated by reference in its entirety. Alternately, workstations 118 may have removable racks and rack interfaces to structure 136 as disclosed in U.S. patent application Ser. No. 17/573,910 having filing date of Jan. 12, 2022 and entitled "TRANSPORT RACK AND TRANSPORT RACK DOCKING INTERFACE" hereby incorporated by reference in its entirety.

As noted above, the order fulfillment facility 100 may further include a number of mobile robots 130 for transferring totes or other product or order containers to and from workstations 115 and storage locations 106 in the bays 104. The mobile robots 130 may be self-guided and/or rail-guided so as to move horizontally and vertically within aisles 108 to transfer totes or other product containers between the mobile robots 130 and storage locations 106. For example, a track system including horizontal rails may be affixed to the bays 104 at different vertical levels. The horizontal rails provide access to storage shelves on either side of an aisle 108. The bays 104 and structures 134, 136 may include vertical level changing towers 122 within which the mobile robots may travel vertically in the z-direction between levels of storage locations 106. Fulfillment facility 100 is shown as an exemplary goods to person picking system, for example, as disclosed in U.S. Provisional Patent Application Ser. No. 63/250,887 having filing date of Sep. 30, 2021 and entitled "AUTOMATIC STORAGE AND RETRIEVAL SYSTEM HAVING STAGING AND SEQUENCING BUFFER LOCATIONS AND SEGREGATED STORAGE" hereby incorporated by reference in its entirety.

Further details of the workstations, storage structure and mobile robot which may be used are described for example in the following U.S. patents and patent applications: U.S. Pat. No. 9,139,363, to John Lert, entitled "Automated System For Transporting Payloads," issued Sep. 22, 2015; U.S. Pat. No. 10,435,241, to John Lert and William Fosnight, entitled, "Storage and Retrieval System," issued Oct. 8, 2019; and U.S. Pat. No. 11,142,398, to John Lert and William Fosnight, entitled, "Order Fulfillment System," issued Oct. 12, 2021. Each of these patents and applications are incorporated by reference herein in their entirety. Although order fulfillment facility 100 has been described with respect to autonomous Bots having the ability to transport totes from storage to decks to workstations and back, the automated and semi-automated dispense embodiment and disclosure regarding the operation of the dispense function is not limited by the automation configuration described.

Fulfillment facility 100 is shown having an exemplary dispense portion 146 having a parking area 150 and a barrier or wall 152 (not shown for clarity in FIG. 2) that isolates customer or pick up vehicles 154 from the enclosure or building housing the G2P (Goods to Picker) or ASRS (Automated storage and retrieval) system. Dispense portion 146 is shown having a multi-level, asynchronous, manual dispense that allows a given operator to collect a consolidated group of totes from workstation 160 where the group of consolidated totes are formed on racks 164 and the workstation 160 may be (or include) portals or docking stations as described with respect to workstations 118. Here, the associate does not need to remain fixed at a given workstation while the Bots within the ASRS are grouping and depositing totes are dispensed from the storage structure 102 into a given workstation 160. Once an order is consolidated in one or more racks, the associate will need to transport the tote grouping in the rack to its destination ultimately for fulfillment. Here, orders ready to be ultimately fulfilled by delivery to customer vehicles 154 may be buffered, for example, in staging areas 168 until a given customer arrives at which point the one or more racks having totes making up the order may be brought out to the vehicle and contents unloaded, for example at rack 170. Staging area 168 may be provided such that racks can be staged near customer pickup for quick dispense to a customer vehicle or otherwise, for example, in close proximity to be placed onto a delivery truck. Once the rack(s) 170 are emptied, the rack(s) may be returned to a buffering area 168, back to a portal or workstation 160 to be refilled by the Bots is the ASRS system or alternately to a location for intermediate operations such as cleaning or bagging. In the embodiment shown, the racks have totes 2 wide by 4 tall. In alternate embodiments more or less rows and/or columns of totes may be provided. Racks 164 may be moved by associates, autonomous mobile robot (AMR) or any suitable method.

Figure 3:
FIG. 3 shows an isometric view of an exemplary rack with exemplary totes, in accordance with some embodiments.
Figure 4:
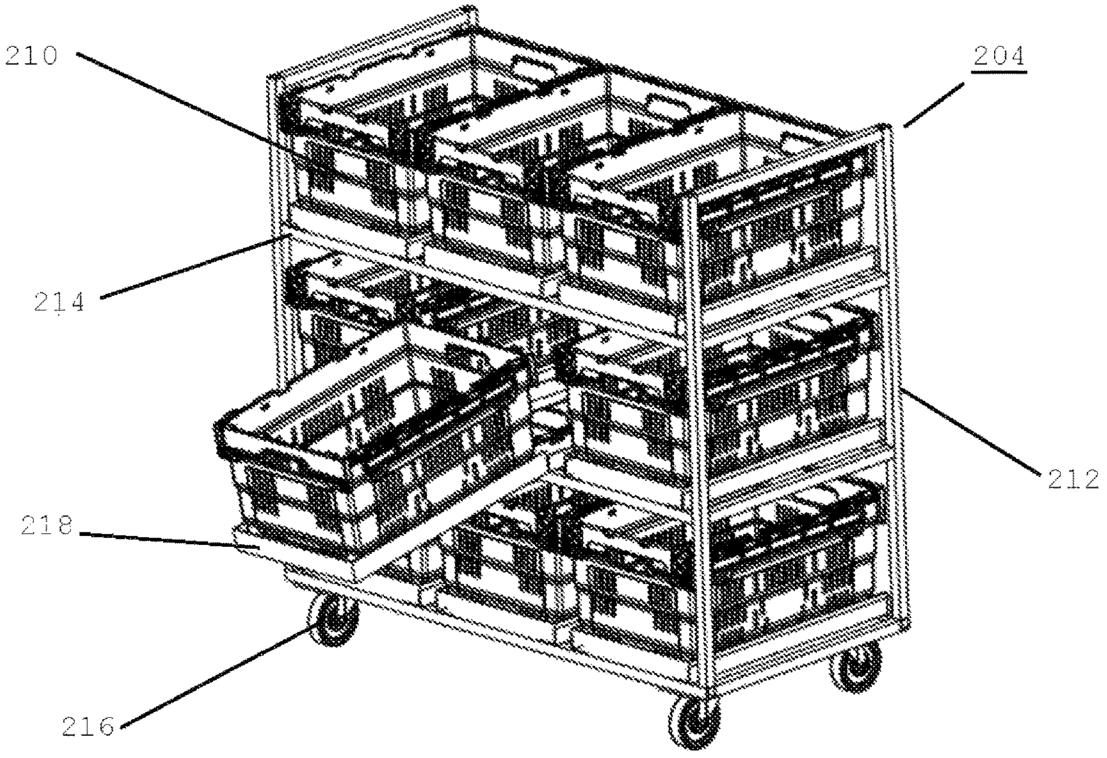
FIG. 4 shows an isometric view of an exemplary rack having one exemplary totes exposed, in accordance with some embodiments.

Referring now to FIG. 3, there is shown an isometric view of an exemplary rack 204, similar to rack 170 but having 9 totes, in accordance with some embodiments. Referring also to FIG. 4, there is shown an isometric view of an exemplary rack 204 having one of the totes exposed for picking, in accordance with some embodiments. Rack 204 is shown having 3 rows and 3 columns of totes and alternately may have more or less rows and/or columns. Rack 204 has structure 212 with columns and shelves 214 for supporting the totes 210. Rack 204 has casters 216 that allow the rack to be easily moved around. The totes may be supported by a moveable shelf or drawer 218 where, as seen in FIG. 4, a given tote may be pulled out to access the contents easily. Rack 204 may have other features such as: (1) docking features that allow rack 204 to interface with storage structure 102, (2) ergonomic handles that allow an operator to easily move the rack, (3) automation features that allow an AMR or other automation to move or dock with, move and/or access the contents of rack 204, (4) indicator or display that indicates operations with respect to rack 204 such as order ready to dispense, which parking space to be transported to or otherwise.

Figure 5:
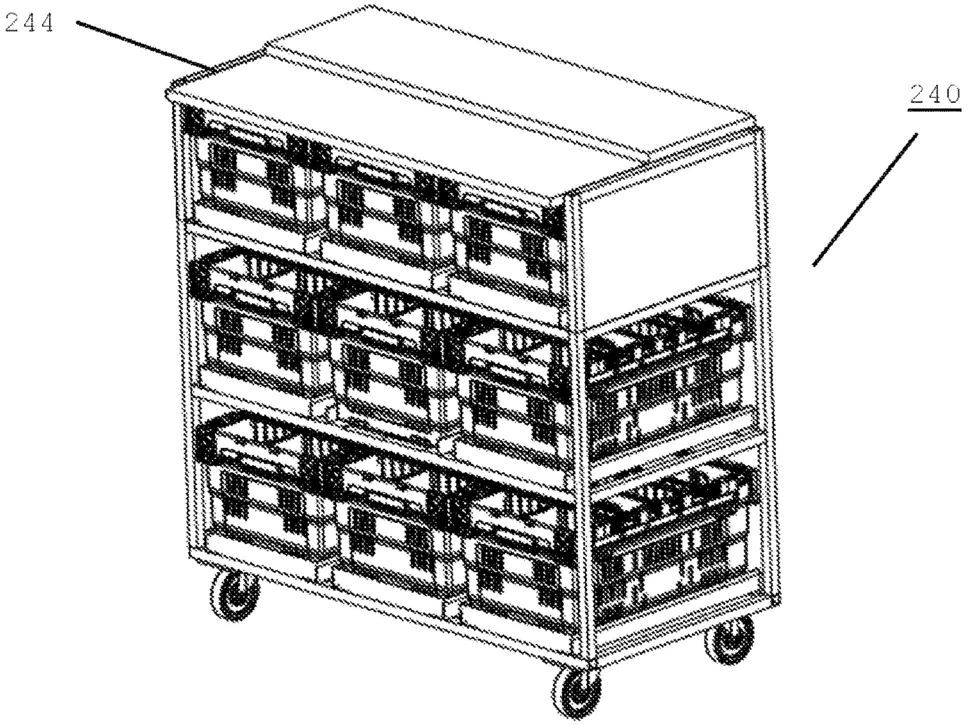
FIG. 5 show an isometric view of an exemplary rack having exemplary totes with a row having exemplary insulation, in accordance with some embodiments.
Figure 6:
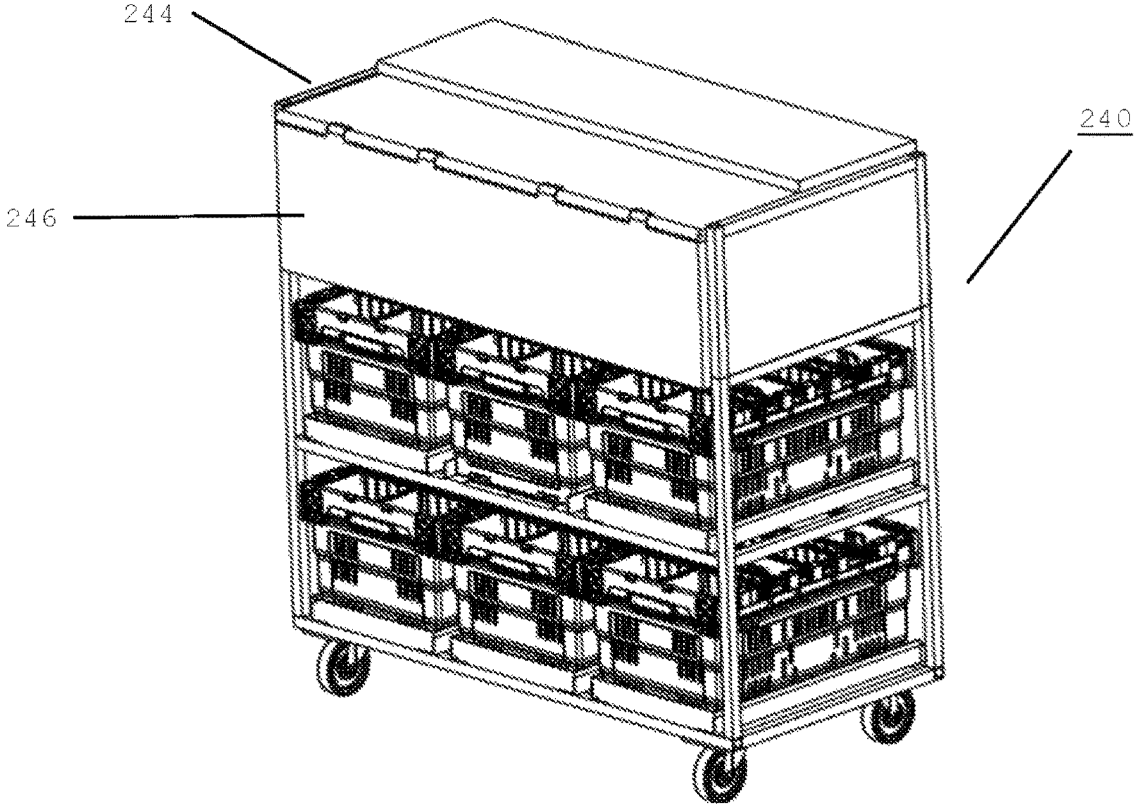
FIG. 6 shows an isometric view of an exemplary rack with a row having exemplary insulation, in accordance with some embodiments.

Referring now to FIG. 5, there is shown an isometric view of an exemplary rack 240, similar to rack 170 but having 9 totes with the top row having exemplary insulation 244, in accordance with some embodiments. Referring also to FIG. 6, there is shown an isometric view of an exemplary rack 240 with the top row having exemplary insulation 244, in accordance with some embodiments. Rack 240 may have features as disclosed with respect to rack 204 but adding insulation 244. When an order is formed for dispense, some of the contents in the order may have chilled or frozen goods. With rack 240, an insulated portion 244 is provided to house these totes with chilled or frozen goods where the insulated portion may be exposed as seen in FIG. 5 such that the Bots may deposit the totes in rack 240 from storage 102 or otherwise. An insulated wall 246 may be provided after the chilled or frozen totes have been deposited in rack 240 where wall 246 may be hinged or otherwise located with respect to insulated portion 244 and put in position to enclose the totes after the totes have been deposited manually, automatically or otherwise. Upon dispense at a customer vehicle, the wall 246 may be moved to expose the totes and the contents unloaded. In the embodiment shown, 3 tote positions are insulated; in alternate aspects more or less may be provided with the insulated portion 244. The chilled or frozen totes may be deposited directly from the chilled and frozen storage or alternately have ice or ice substitutes added or integrated to maintain cold chain integrity. Similarly, a tote having ice or ice substitutes added or integrated may be placed in the insulated volume from chilled or frozen storage to maintain the cold chain integrity of the remaining totes.

Figure 7:
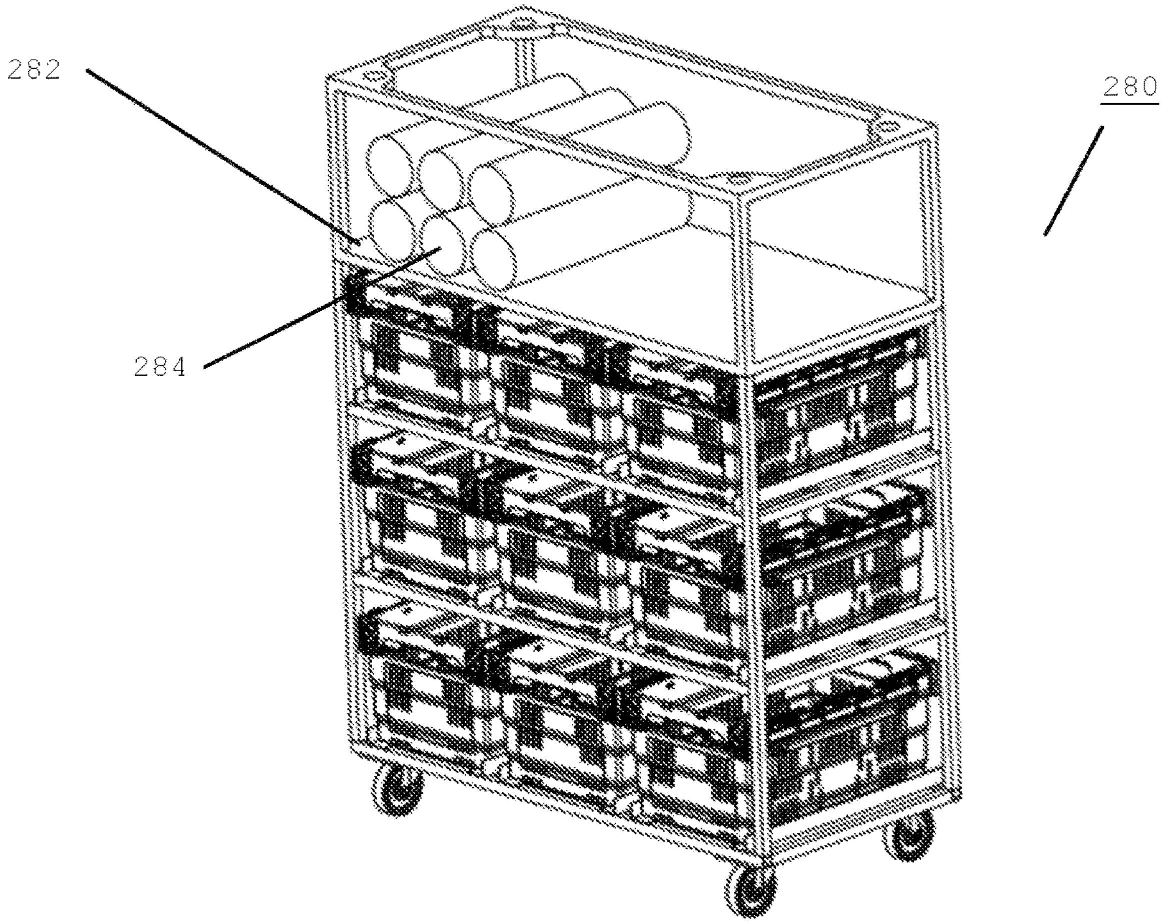
FIG. 7 shows an isometric view of an exemplary rack having exemplary totes with a portion to receive items, in accordance with some embodiments.

Referring now to FIG. 7, there is shown an isometric view of an exemplary rack 280, similar to rack 170 but having 9 totes with a top portion for supplemental items, in accordance with some embodiments. Rack 280 may have features as disclosed with respect to rack 204 or 240 but adding an additional storage volume 282 for items 284 that may form part of a given order that are deposited outside of the ASRS or as the rack is docked with the ASRS. The additional storage volume may be enlarged relative to the storage positions on shelves 218 for storing totes, and items 284 may be oversized items that form part of a given order that associates or otherwise add to the rack. Alternately items 284 may be picked from other sources than the ASRS, for example from a local pick wall or otherwise that are common or otherwise items that are not picked from the ASRS. Similarly, totes having content that were picked from sources other than the ASRS may be put in rack 280 in volume 282 or in totes separately. Although the description may reference any one of the racks disclosed, all such racks or other suitable carts or racks may be used in any such application.

Figure 8:
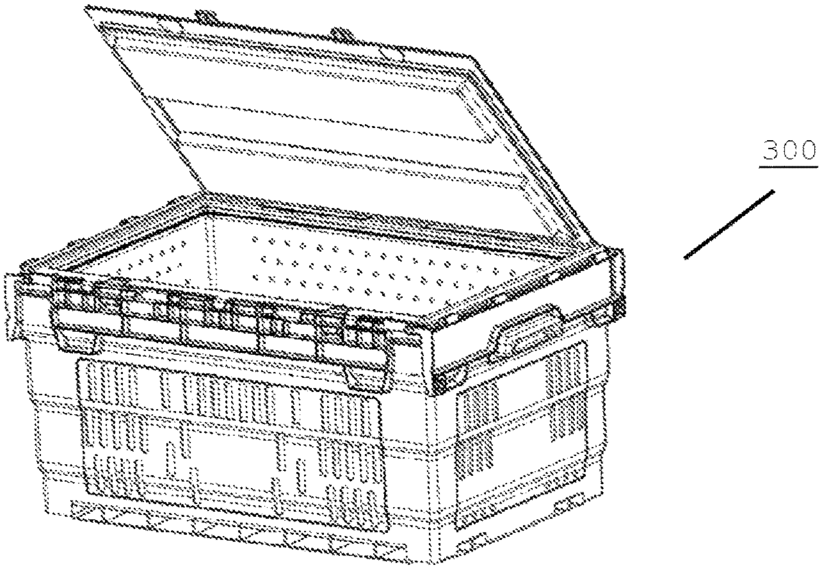
FIG. 8 shows an isometric view of an exemplary chilled tote, in accordance with some embodiments.

Referring now to FIG. 8, there is shown an isometric view of an exemplary chilled tote 300, in accordance with some embodiments. As an alternative to utilizing totes in racks with an insulated volume or utilizing totes with no insulation in racks, one or more chilled totes may be utilized to maintain cold chain integrity while a given order is awaiting customer arrival, for example buffered docked to storage 102 or in buffering location 168. An exemplary chilled tote may be disclosed in disclosed in US Patent Publication No. US2021/0300664A1 having publication date Sep. 30, 2021 and entitled "TOTE HANDLING FOR CHILLED OR FROZEN GOODS" hereby incorporated by reference in its entirety.

Figure 9:
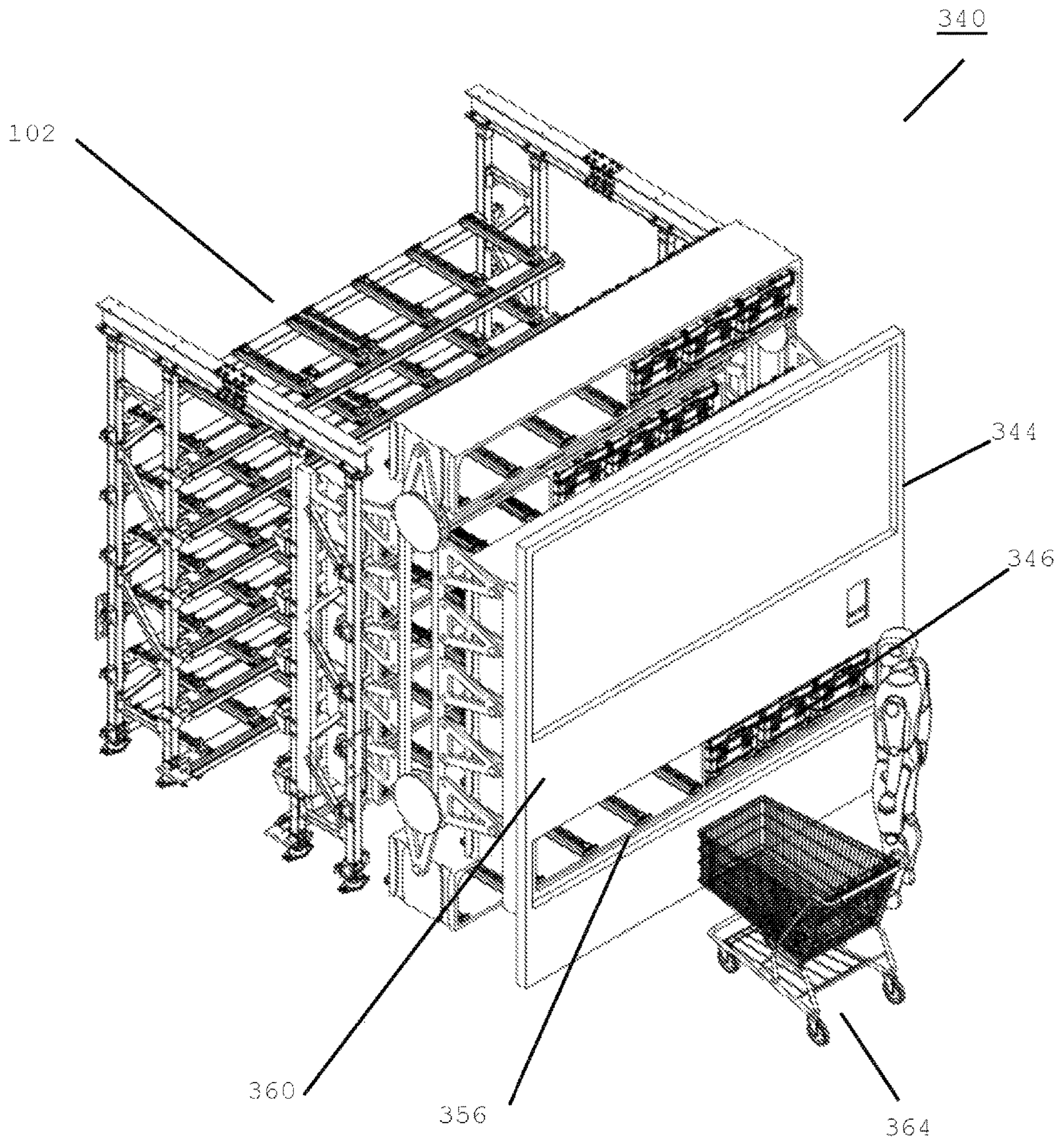
FIG. 9 shows an isometric view of an exemplary buffering arrangement, in accordance with some embodiments.
Figure 10:
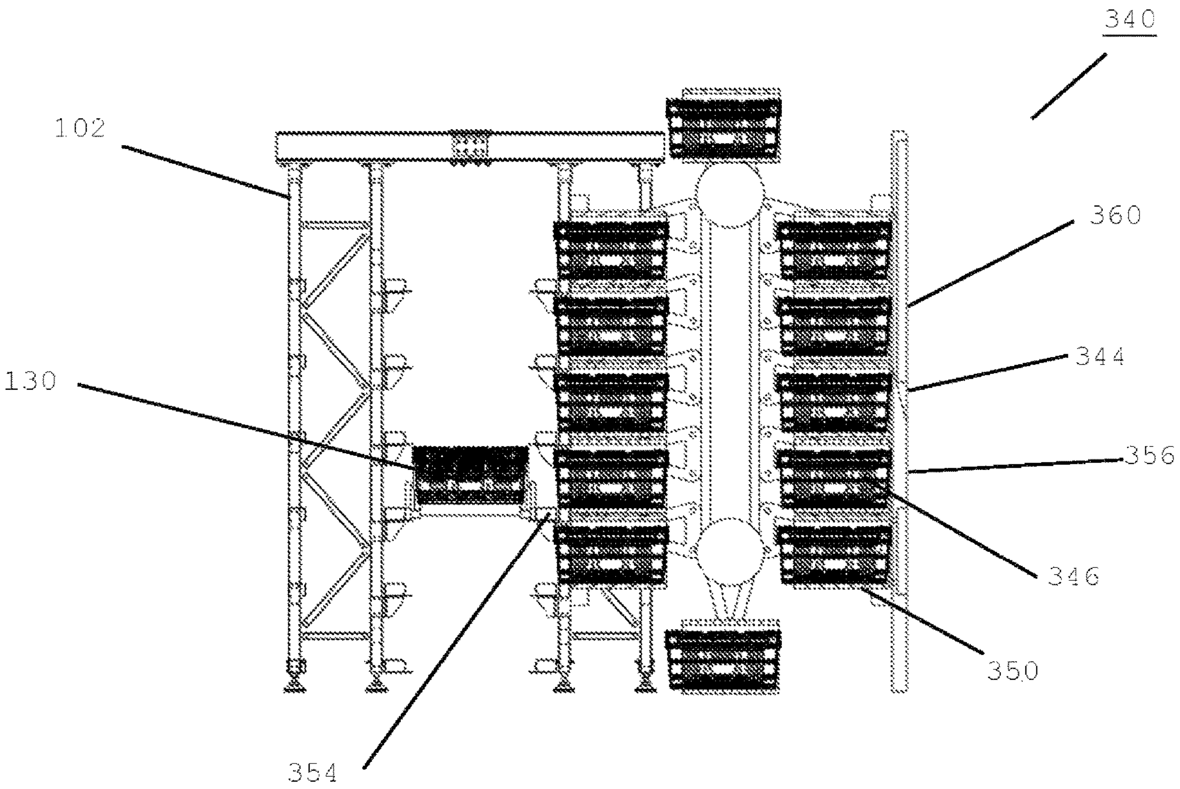
FIG. 10 shows an end view of an exemplary buffering arrangement, in accordance with some embodiments.
Figure 11:
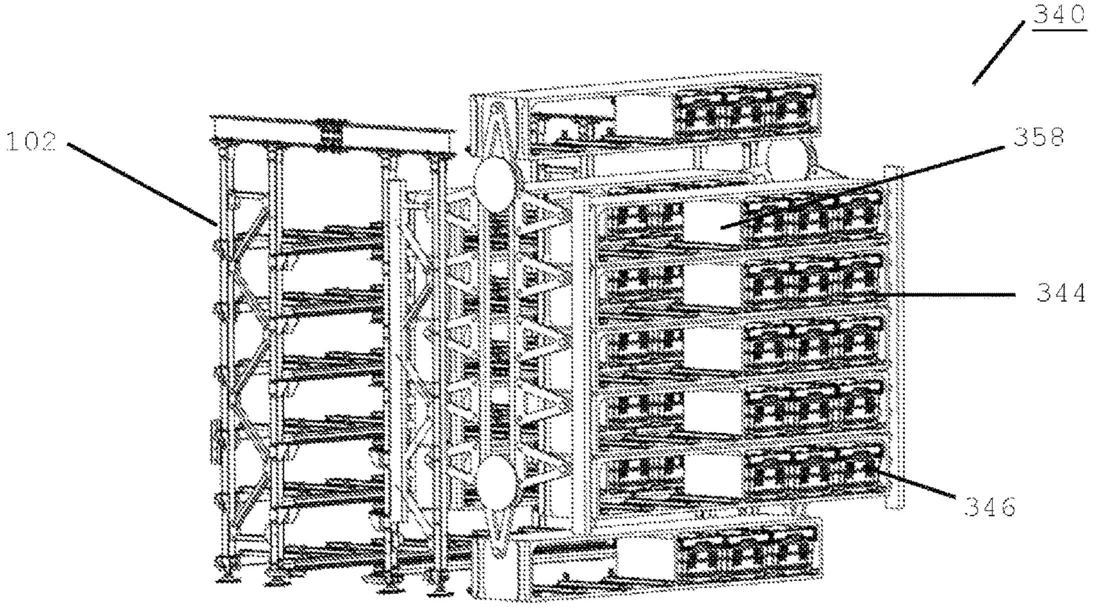
FIG. 11 shows an isometric view of an exemplary buffering arrangement with a cover removed, in accordance with some embodiments.

Referring now to FIG. 9 there is shown an isometric view of an exemplary buffering arrangement 340 (also referred to as a buffering station), in accordance with some embodiments. Referring also to FIG. 10 there is shown an end view of an exemplary buffering arrangement 340, in accordance with some embodiments. Referring also to FIG. 11 there is shown an isometric view of an exemplary buffering arrangement 340 with a cover removed, in accordance with some embodiments. Buffering station 340 is shown having storage structure 102 and paternoster type buffer 344 where Bots 130 deposit totes 346 into paternoster type buffer 344. Here, paternoster type buffer 344 is shown having 12 recirculating shelves where totes can be deposited or retrieved from a storage access side 354 and dispensed or returned on a user access side 356. Here, paternoster type buffer 344 may be divided vertically 358 into a chilled side and an ambient side where, by way of non-limiting example, the columns of totes (36 total) are isolated in an insulated and alternately actively cooled volume from the remaining columns. Alternately the entire environment may be cooled obviating the need for dividers. Paternoster type buffer 344 may have an automatic door on user access side 356 such that the door is closed when the buffer recirculates to prevent injury and opens when the buffer is static or when a given batch of totes is accessed for dispense or return. Similarly, wall or enclosure 360 may be provided to prevent human access. Wall 360 may partially open to expose only those totes to be accessed by a customer 346. Buffer 344 may be deployed similar to interface 160 and 118 as shown above where shopping carts 364 or racks may be provided to place bags or totes for further buffering 168 before dispense where paternoster type buffer 344 may contain multiple orders that are dispensed to shopping carts 364 or racks for transport to customers. Alternately, wall or enclosure 360 may be accessible to a shopper or associate directly through wall 152 where contents may be loaded into shopping carts, racks and/or vehicles directly by customers or associates.

With respect to FIGS. 9-11, rack based (or other embodiments) totes may contain bags of goods making up a given order. Alternately, the totes may contain goods that are not yet bagged where a picker picks straight to order totes (no bags) at workstation 115. Here and before or coincident with a customer showing up, order totes are presented at a "packing station" with bags, for example at 364 where associate (or robot) transfers eaches from order totes at 356 to bags and the bags are transferred to a conventional shopping cart 364 and parked (buffered). Here, when a customer arrives, an associate pushes shopping cart 364 out to the customers car—just like normal customer leaving store with bags in cart. Alternatively, the customer themselves could pick the order and load their car. Here, the customer may get immediate service with the order buffered which immunizes the customer from robot system interrupts. Further, extra bags may be minimized and high packing density may be achieved.

Figure 12:
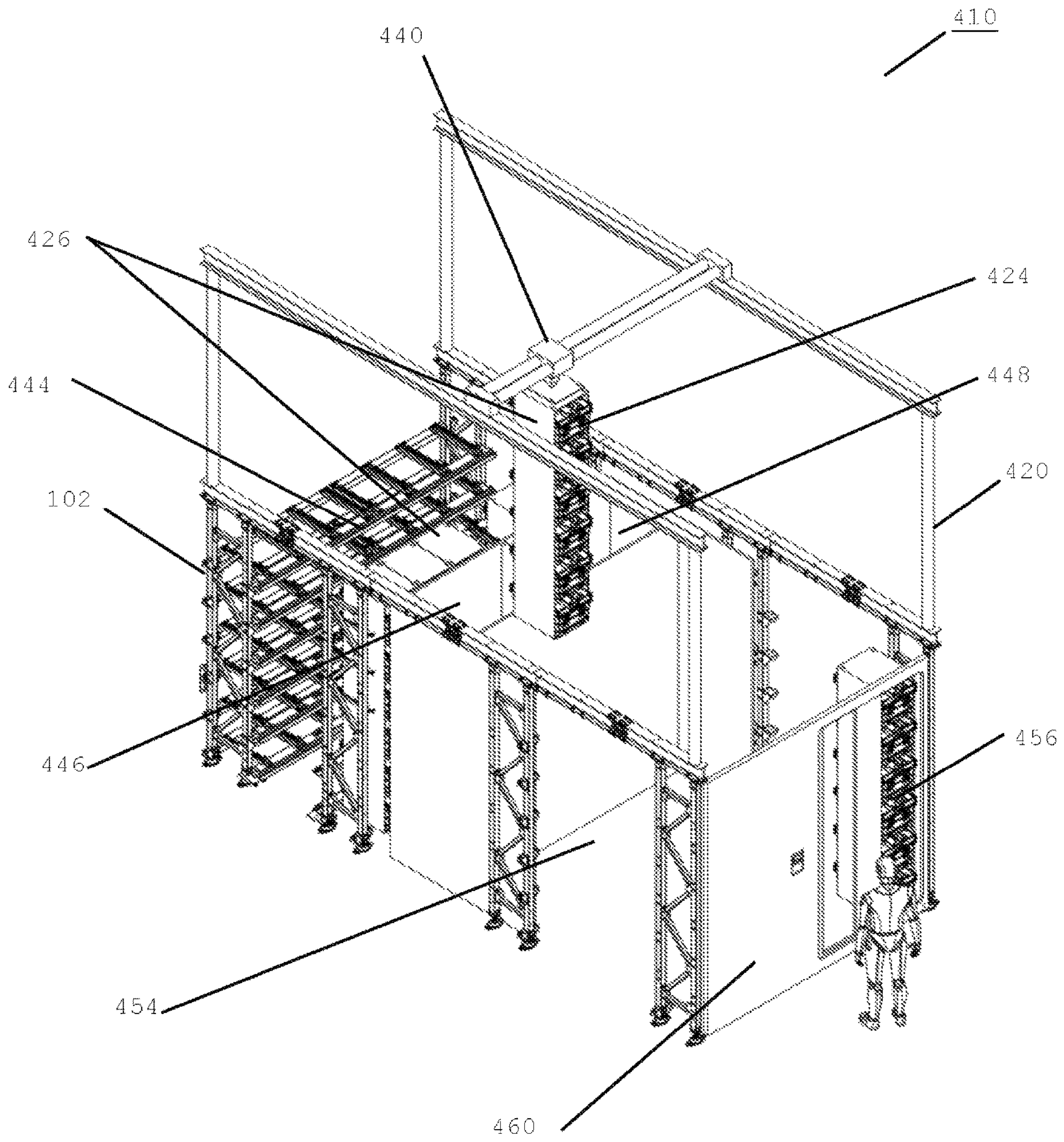
FIG. 12 shows an isometric view of an exemplary buffering arrangement, in accordance with some embodiments.
Figure 13C:
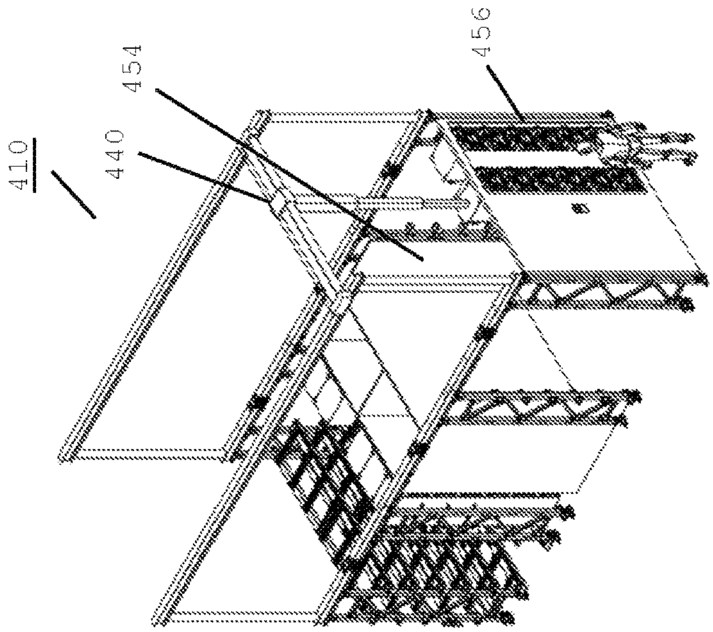
FIGS. 13A-13C show isometric views of exemplary buffering arrangements transferring an exemplary cassette from Bot access locations to an exemplary portal, in accordance with some embodiments.
Figure 13B:
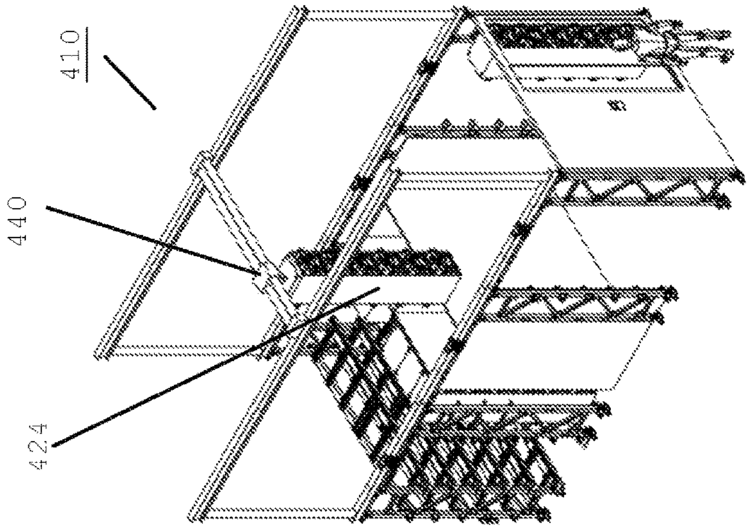
Figure 13A:
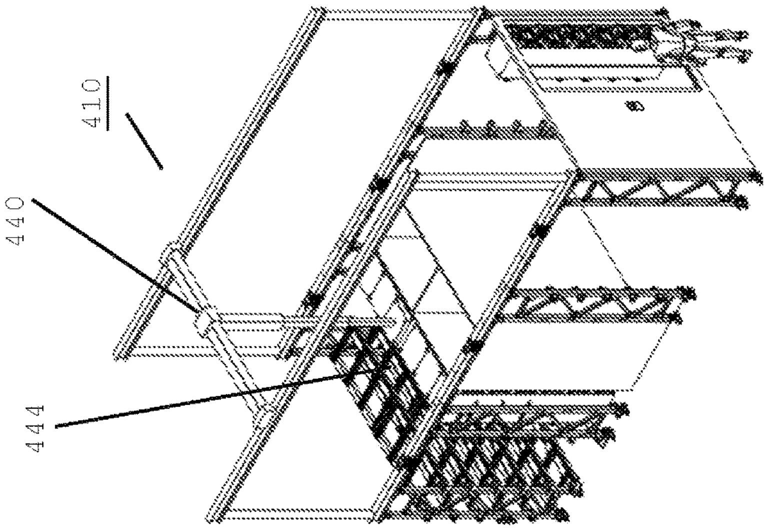

Referring now to FIG. 12 there is shown an isometric view of an exemplary buffering arrangement 410, in accordance with some embodiments. Buffering arrangement 410 is shown having storage structure 102 and gantry type buffer 420 where Bots 130 deposit totes 424 into cassettes 426 that support a non-limiting exemplary column of 6 totes. Gantry 440 is provided and can move the cassettes of totes in a plane, vertically or three-dimensionally, for example where cassettes 426 may be moveable from Bot access locations 444 to and from ambient storage locations 446, chilled storage locations 448 and dispense location 454. Here, gantry type buffer 420 is shown where cassettes of totes can be deposited or retrieved from Bot access locations 444 and dispensed or returned on a user access side at portal 456. Here gantry type buffer 420 may be divided vertically into a chilled side and an ambient portions where, by way of non-limiting example, columns of totes are isolated in an insulated and alternately actively cooled volume from the remaining columns. Alternately, the entire environment may be cooled obviating the need for dividers. Gantry type buffer 420 may have an automatic door on user access side 456 such that the door is closed when the gantry is operational to prevent injury and opens when the gantry is static or when a given batch of totes is accessed for dispense or return. Similarly, wall or enclosure 460 may be provided to prevent human access. Buffer 420 may be deployed similar to interface 160 and 118 as shown above where shopping carts or racks may be provided to place bags or totes for further buffering 168 before dispense where buffer 420 may contain multiple orders that are dispensed to shopping carts or racks for transport to customers. Alternately, wall or enclosure 460 may be accessible to a shopper or associate directly through wall 152 where contents may be loaded into shopping carts, racks and/or vehicles directly by customers or associates. Referring also to FIGS. 13A-13C there is shown exemplary buffering arrangements 410 illustrating exemplary transfers of exemplary cassettes 424 from Bot access locations 444 to a user access side at portal 456, in accordance with some embodiments.

Figure 14:
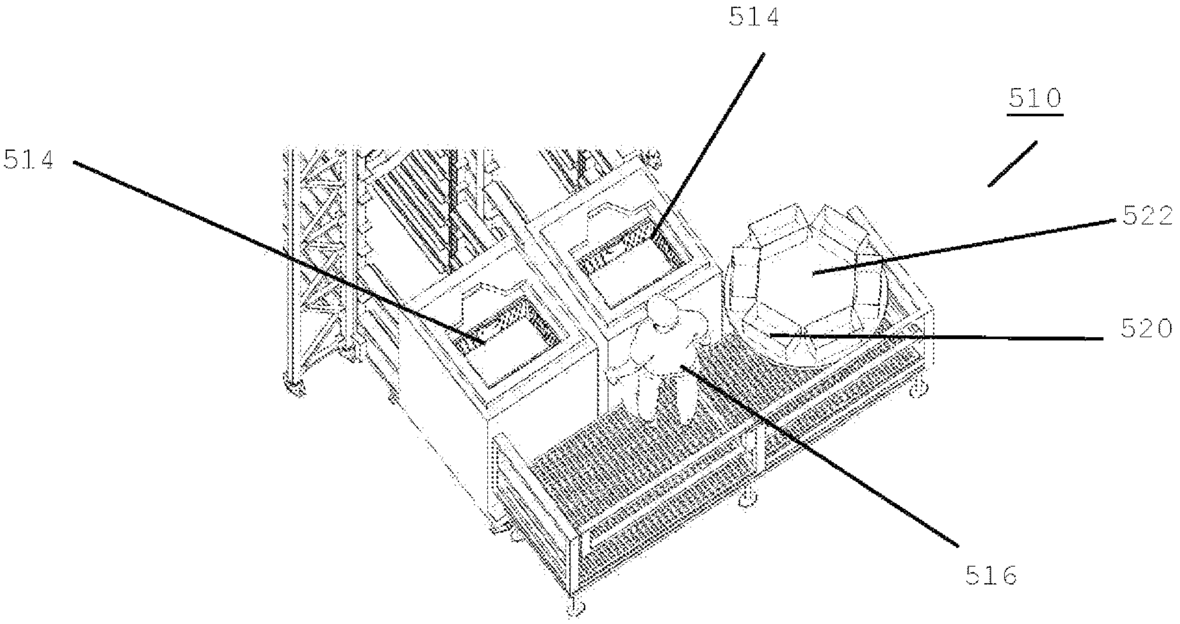
FIG. 14 shows an exemplary picking workstation, in accordance with some embodiments.
Figure 15:
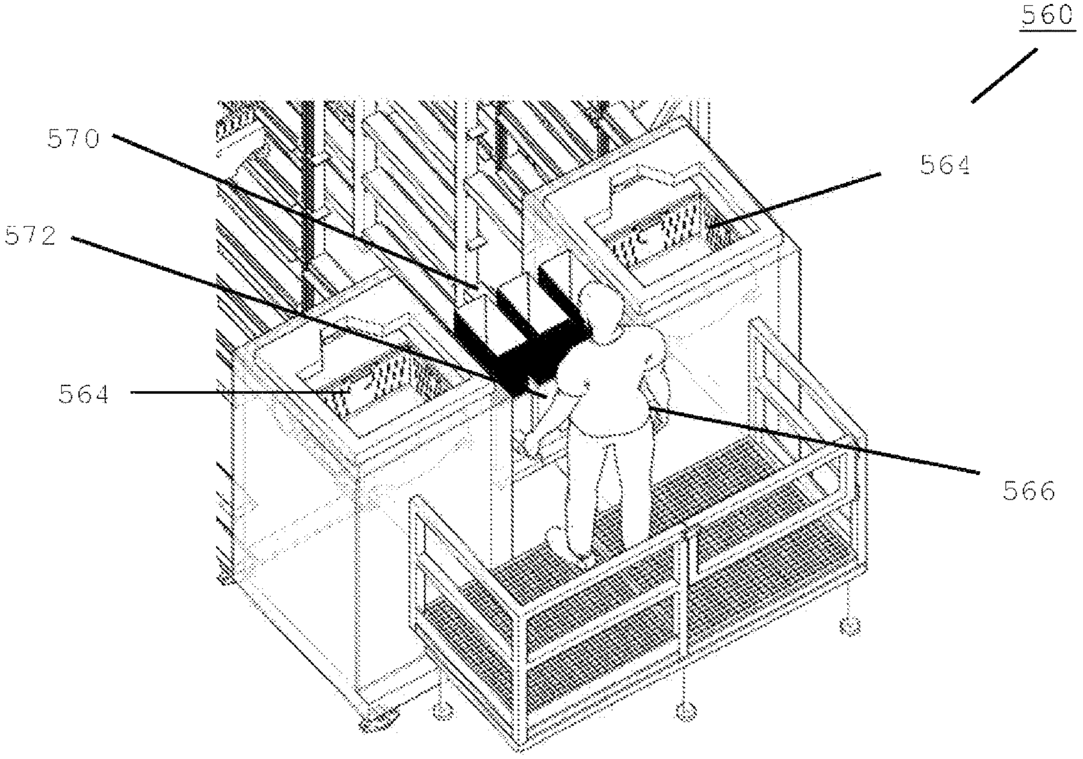
FIG. 15 shows an exemplary picking workstation, in accordance with some embodiments.

Referring now to FIG. 14, there is shown an exemplary picking workstation 510, in accordance with some embodiments. Picking workstation 510 may have features similar to picking workstations 115. In the embodiment shown incoming bots with product totes 514 sequentially present products to picker 516 who may be a human or robotic picker where picker 516 picks items from product totes 514 and places them in containers or bags 520 that are located on rotating carousel 522. The bags may be placed in order totes through picking workstation 510 and stored in storage 102. Alternately the bags may be placed in a traditional shopping cart or other storage or rack separate from storage 102 by the picker 516 or by a separate picker in parallel. Referring also to FIG. there is shown an exemplary picking workstation 560, in accordance with some embodiments. Picking workstation 560 may have features similar to picking workstations 115. In the embodiment shown incoming bots with product totes 564 sequentially present products to picker 566 who may be a human or robotic picker where picker 566 picks items from product totes 564 and places them in containers or bags 520 that are located on container or bag dispenser 572. The bags may be placed in order totes through picking workstation 560 and stored in storage 102. Alternately the bags may be placed in a traditional shopping cart or other storage or rack separate from storage 102 by the picker 566 or by a separate picker in parallel.

The picking workstations may operate in two modes—picking and/or dispense. Picking only may be where order totes are filled at the picking workstation and returned to storage and are buffered in storage 102 and ultimately dispensed to bags, totes or carts (racks) via workstations 160. The carts are stored or buffered at workstations 160 in picking area 168 for a time, for example, within 1 hour of final dispense to customer. Alternately the picking workstation may work in both a picking and dispense mode. As a picking and packing station where picking the workstation is used as pick station, for example, in the early AM or at peak pick times where eaches go into order totes (may be with no bags). The same picking workstation may be used as a packing station, for example, 1 hour ahead of customer arrival, where the order totes return and flow enabling the now packer (instead of picker) to pack the bags at exemplary workstations 510, 560 that go into shopping carts, and into the 168 staging area.

Figure 16:
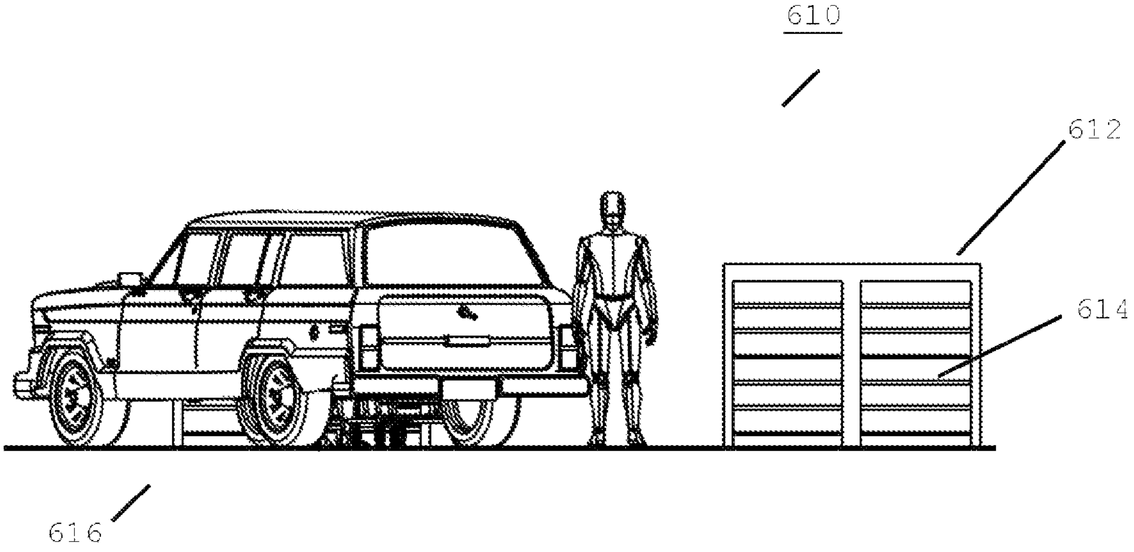
FIG. 16 shows an exemplary customer pick up location, in accordance with some embodiments.
Figure 17:
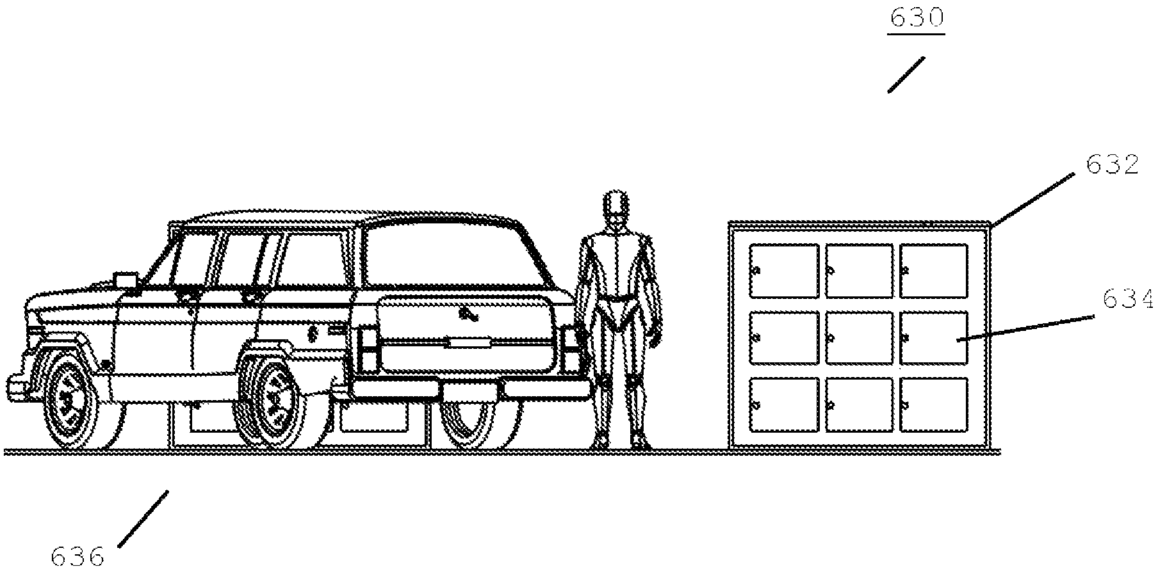
FIG. 17 shows an exemplary customer pick up location, in accordance with some embodiments.
Figure 18:
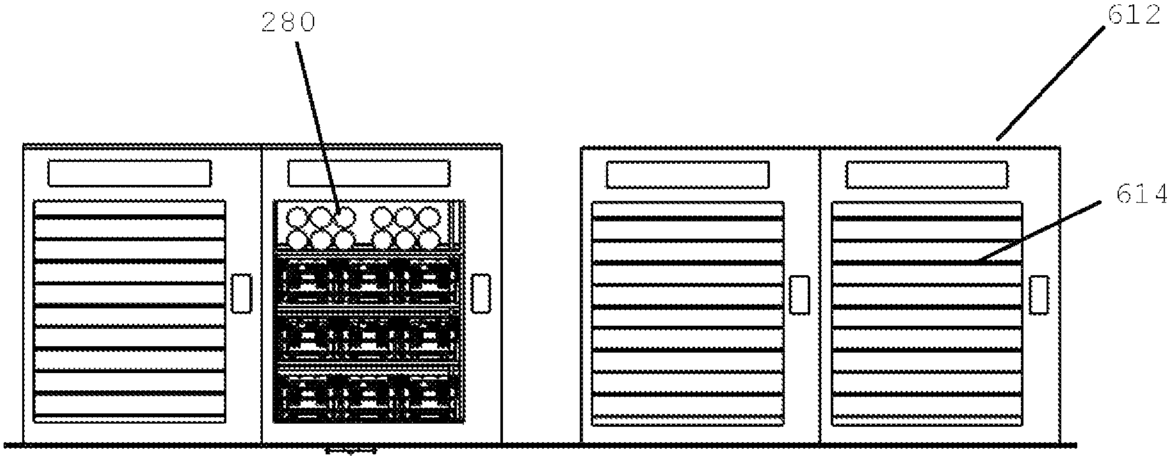
FIG. 18 shows an exemplary customer pick up location with an exemplary group of portals having doors, and expose exemplary rack, in accordance with some embodiments.

Referring now to FIG. 16 there is shown an exemplary customer pick up location 610, in accordance with some embodiments. Pick up location 610 has a parking space 616 where a customer may come to pick up an order being dispensed. A dispense portal 612 may be local to the parking space where door 614 may be opened or raised exposing a cart, rack, cassette, shopping cart or otherwise containing all or a portion of the order. The exposed order may be unloaded directly from the portal where the cart, rack, cassette, shopping cart or otherwise remains at the portal. Alternately the cart, rack, cassette, shopping cart or otherwise may be removed from the portal 612 and transported closer to the vehicle for unloading by the customer or associate. Referring now to FIG. 17 there is shown an exemplary customer pick up location 630, in accordance with some embodiments. Pick up location 630 has a parking space 636 where a customer may come to pick up an order being dispensed. A dispense portal 632 may be local to the parking space where lockers 634 may be opened exposing totes or order bags or otherwise containing all or a portion of the order. The exposed order may be unloaded directly from the portal where the totes or order bags or otherwise remains at the portal. Alternately the totes or order bags or otherwise may be removed from the portal 612 and transported closer to the vehicle for unloading by the customer or associate. By way of example, a group of portals 612 having doors 614 can expose rack 280 as seen in FIG. 18, in accordance with some embodiments.

Figure 19:
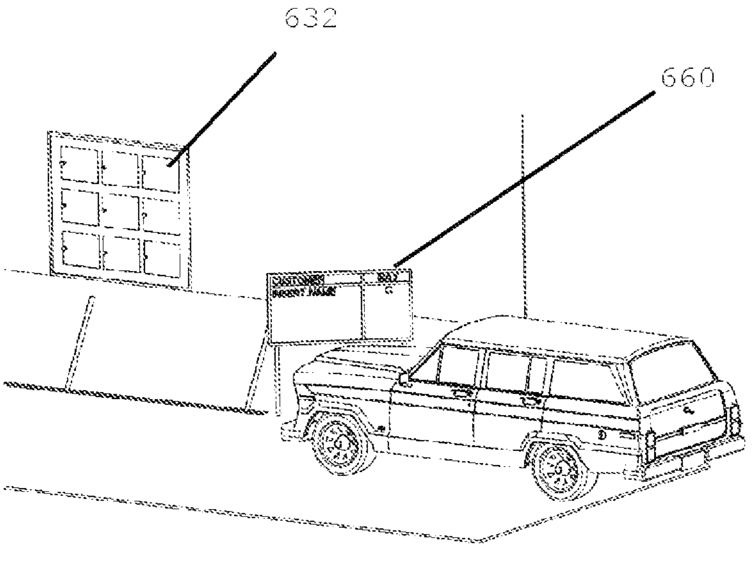
FIG. 19 shows a series of exemplary pick-up locations, in accordance with some embodiments.

Referring now to FIG. 19 there is shown exemplary customer entering a series of pick-up locations 632, in accordance with some embodiments. In the embodiment shown, a customer notification display 660 directs the customer to the portal at which their order is located. Alternately, the customer may be notified by any method including via cell or otherwise. Alternately, the customer may pick up their order at a randomly selected portal.

Figure 20:
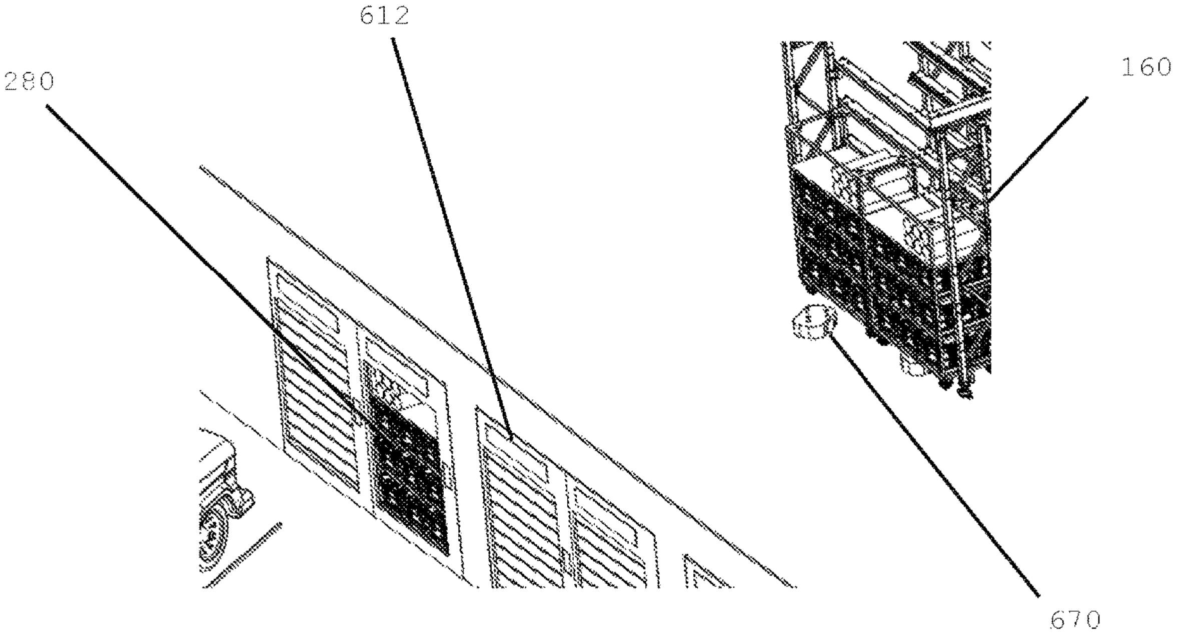
FIGS. 20 and 21 show isometric and top views, respectively, of exemplary dispense configurations with an exemplary autonomous mobile robot (AMR), in accordance with some embodiments.
Figure 21:
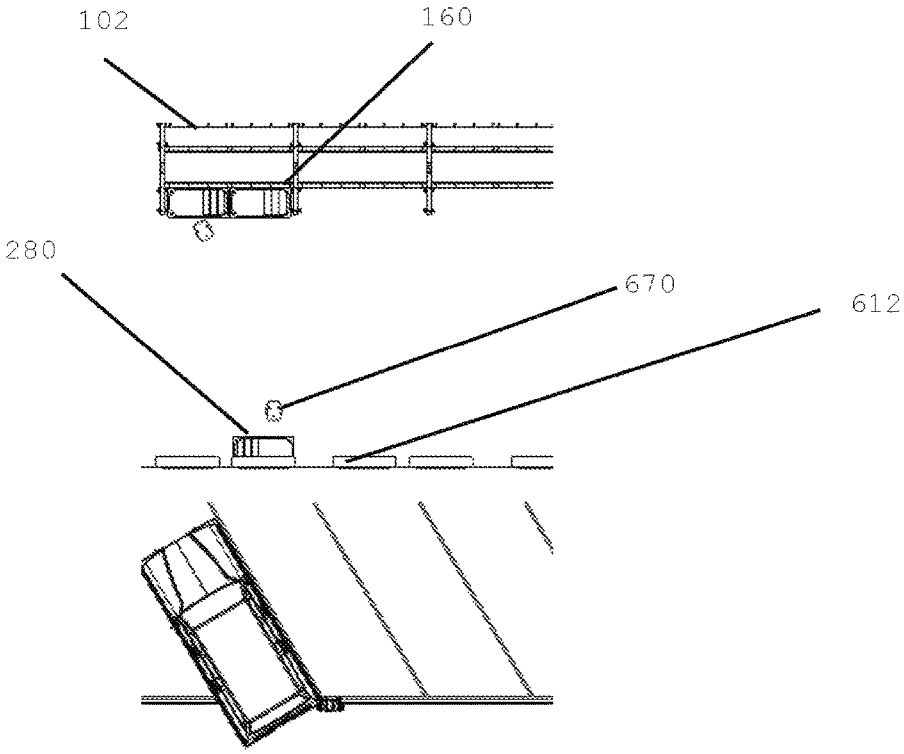
Figure 22:
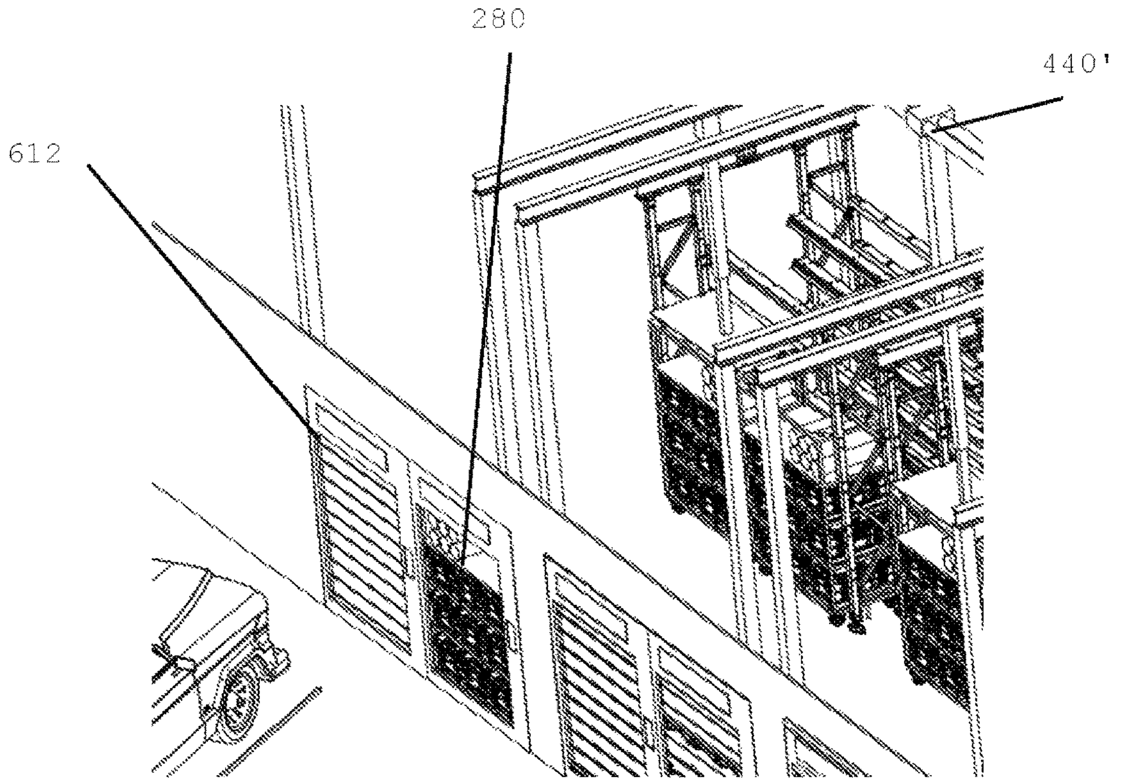
FIGS. 22 and 23 show isometric and top views, respectively, of exemplary dispense configurations including an exemplary gantry configured to move an exemplary rack, in accordance with some embodiments.
Figure 23:
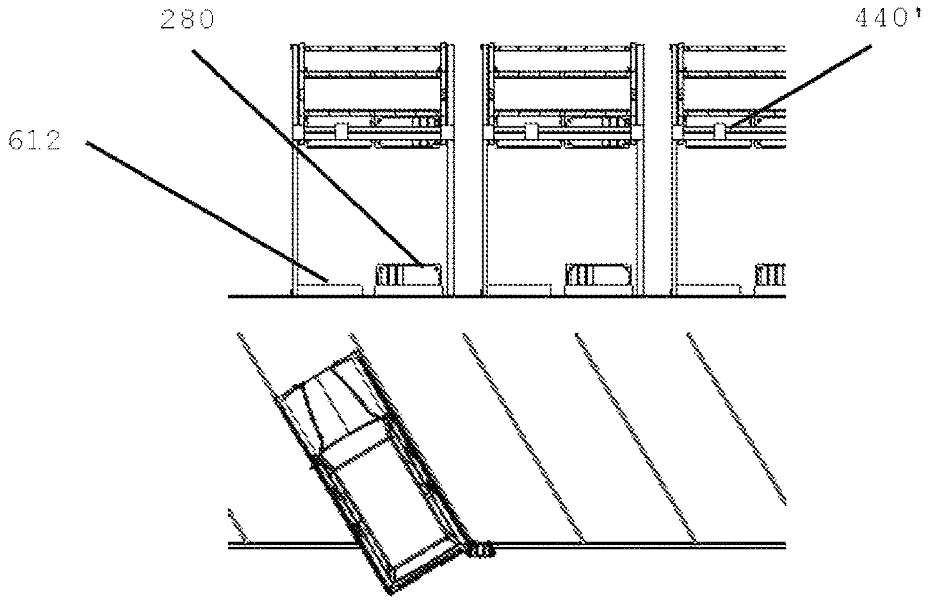
Figure 24:
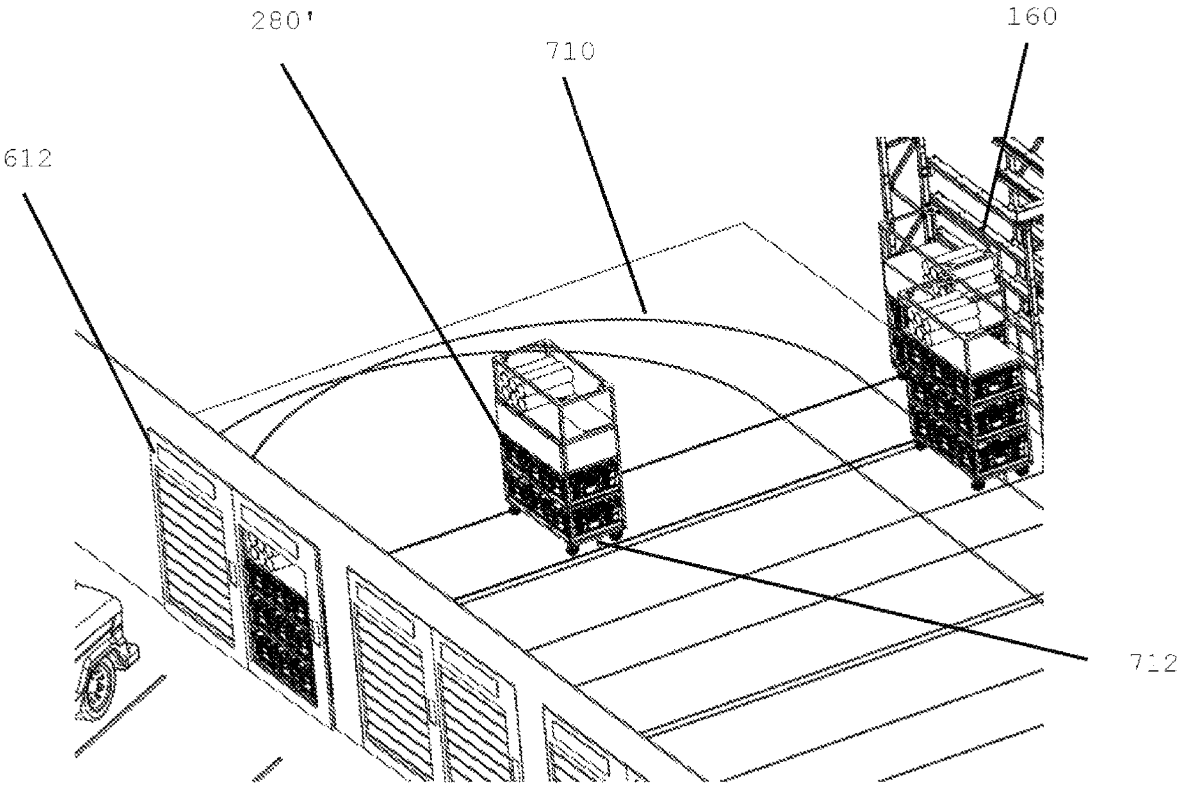
FIGS. 24 and 25 show isometric and top views, respectively, of exemplary dispense configurations including an exemplary towline configured to move an exemplary rack having towline engagement pin, in accordance with some embodiments
Figure 25:
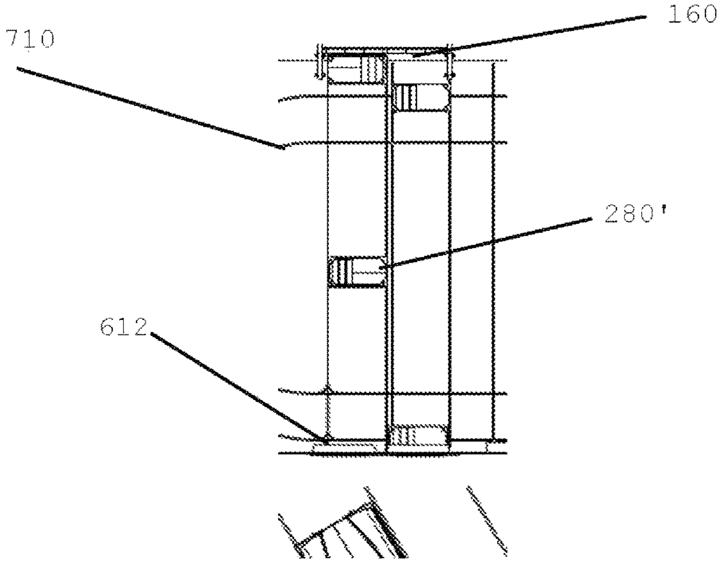
Figure 26:
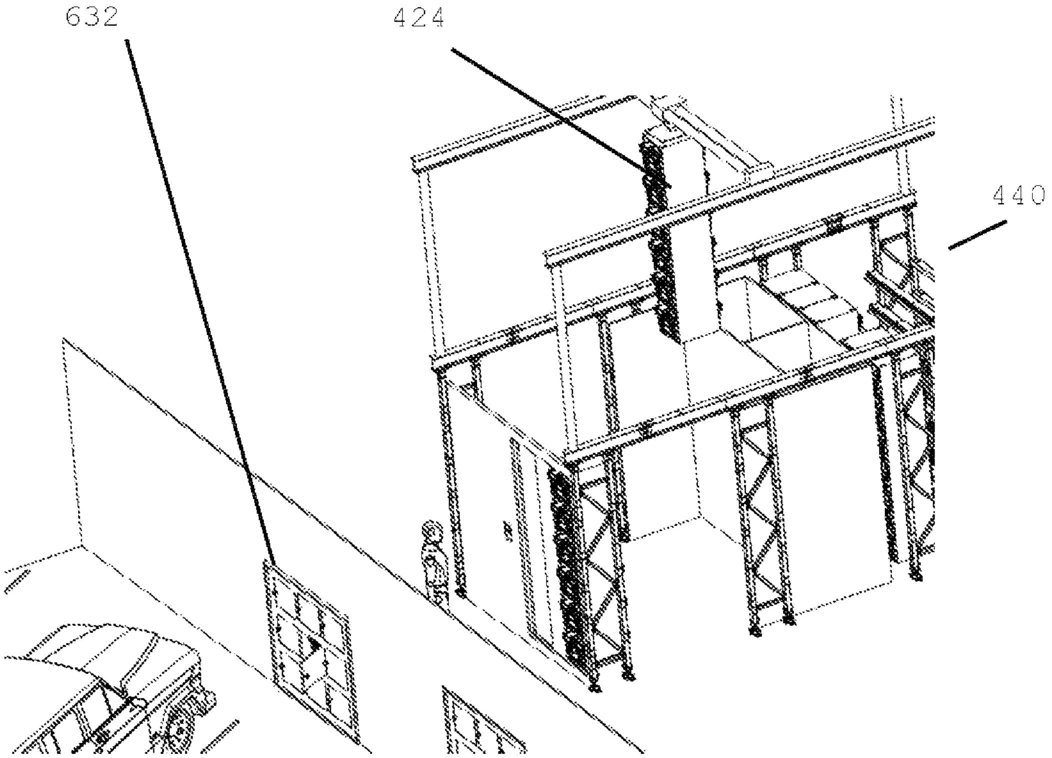
FIGS. 26 and 27 show isometric and top views, respectively, of exemplary dispense configurations including an exemplary gantry configured to deliver exemplary cassettes of totes to be placed in exemplary lockers, in accordance with some embodiments.
Figure 27:
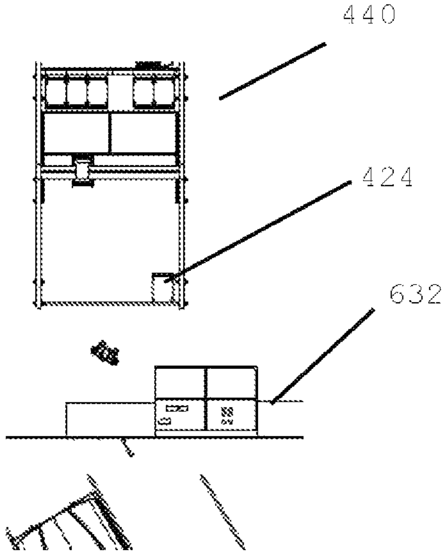
Figure 28:
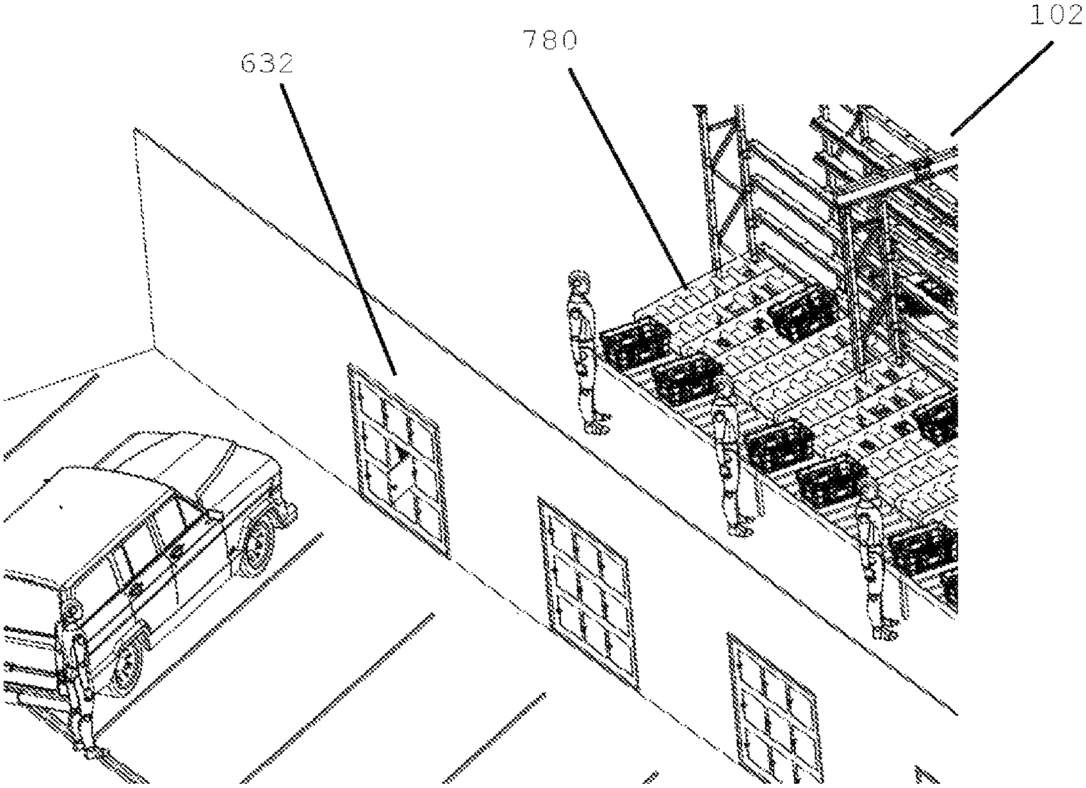
FIGS. 28 and 29 show isometric and top views, respectively, of exemplary dispense configurations, in accordance with some embodiments.
Figure 29:
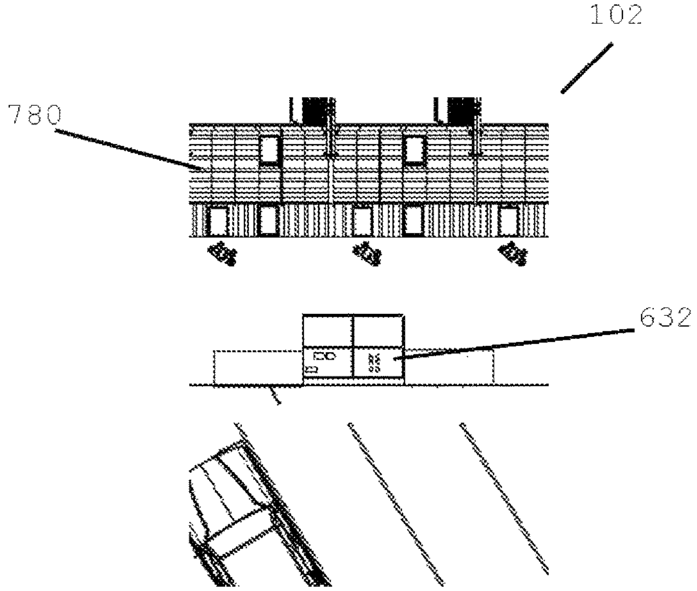
Figure 30:
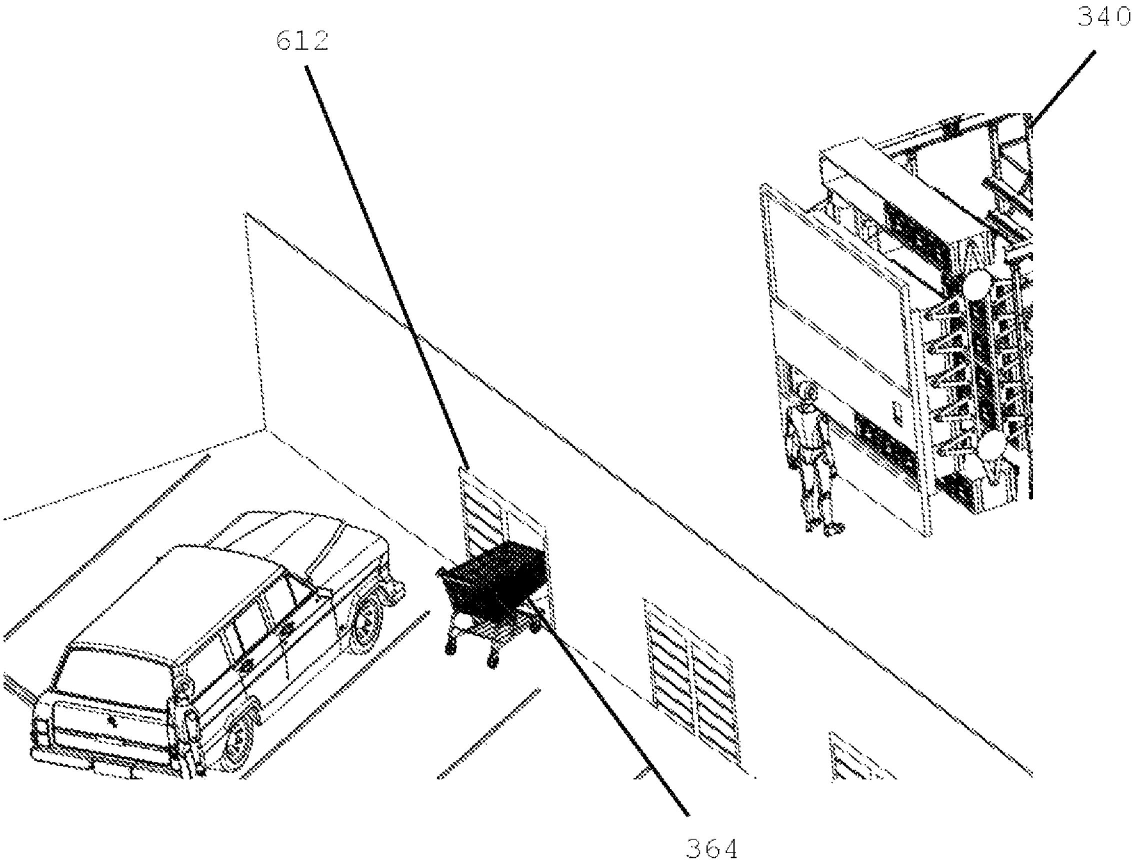
FIGS. 30 and 31 shows isometric and top views, respectively, of exemplary dispense configurations, in accordance with some embodiments.
Figure 31:
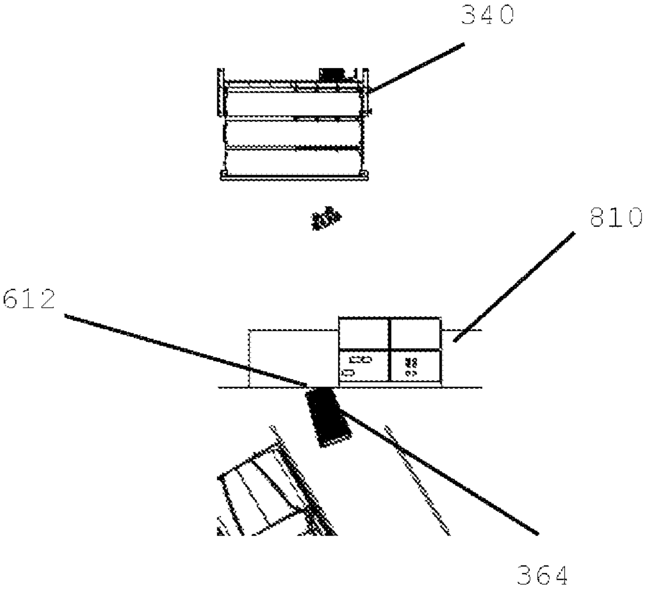
Figure 32:
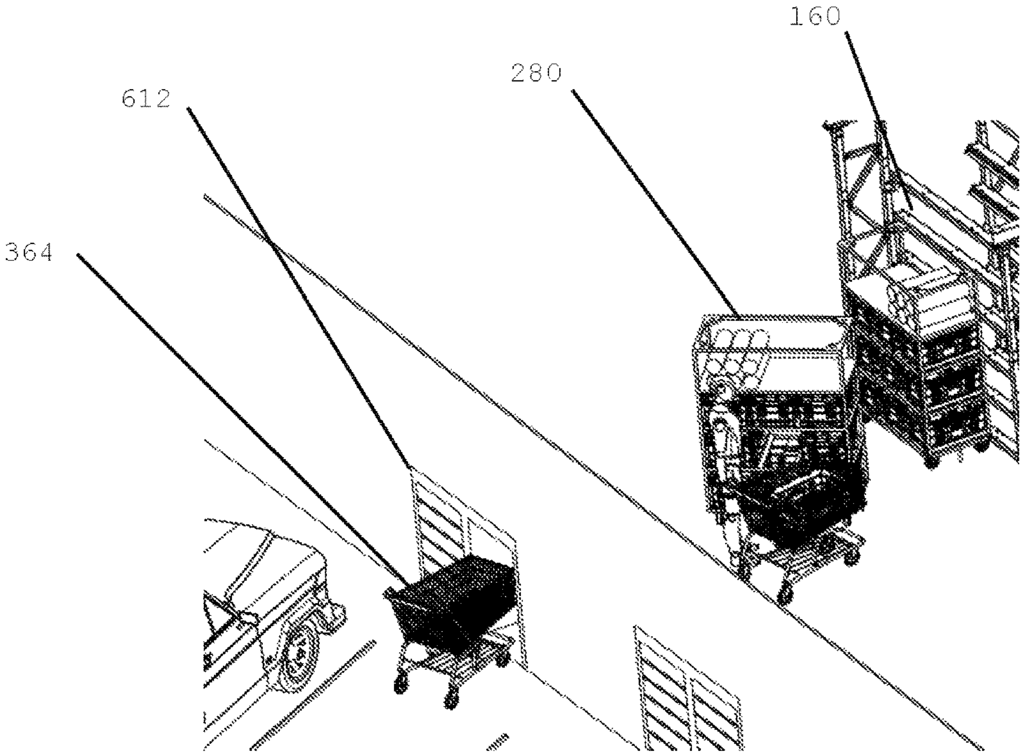
FIG. 32 shows an isometric view of an exemplary dispense configuration utilizing an exemplary cart, in accordance with some embodiments.
Figure 33:
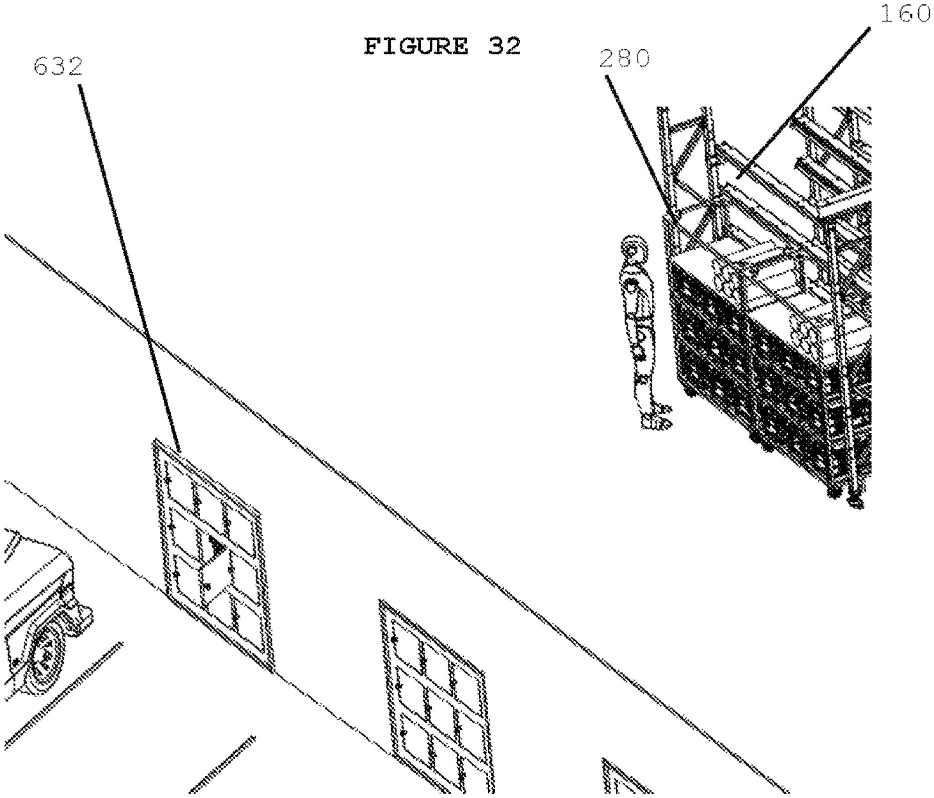
FIG. 33 shows an isometric view of an exemplary dispense configuration used to load lockers, in accordance with some embodiments.
Figure 34:
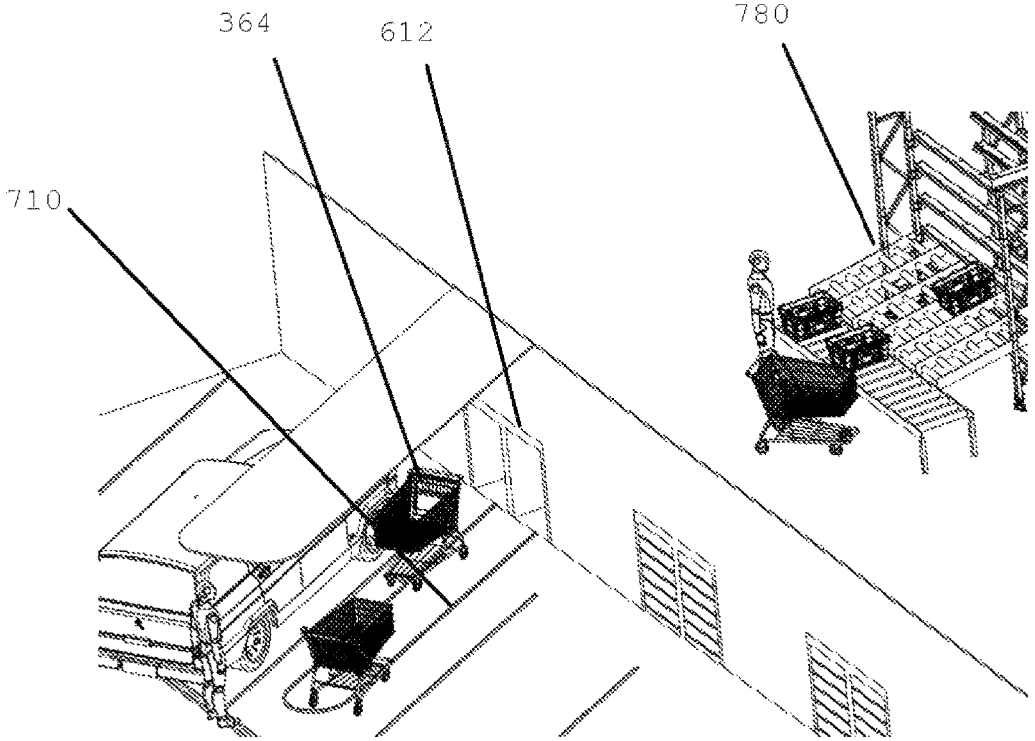
FIG. 34 shows an isometric view of an exemplary dispense configuration used in cooperation with exemplary carts, in accordance with some embodiments.
Figure 35:
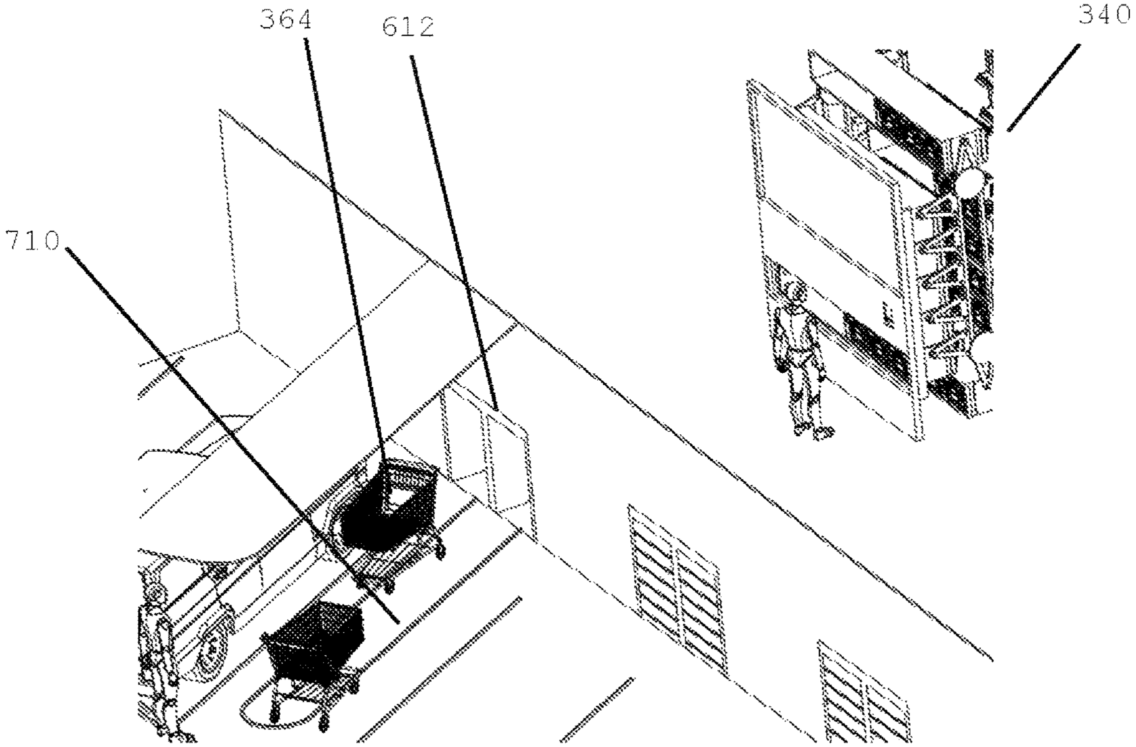
FIG. 35 shows an isometric view of an exemplary dispense configuration, in accordance with some embodiments.

Referring now to FIGS. 20 and 21 there are shown isometric and top views, respectively, of an exemplary dispense configuration, in accordance with some embodiments. Here, an exemplary workstation or portal 160 has filled rack 280 with order totes and the rack 280 is transported to be buffered or for pick up at portal 612 via AMR 670 automatically. In alternate aspects the AMR may deliver the rack through the portal directly close to the vehicle for unloading by the customer or an associate. Referring also to FIGS. 22 and 23 there are shown isometric and top views, respectively, of an exemplary dispense configuration, in accordance with some embodiments. The embodiment shown in FIGS. 22 and 23 is similar to that shown in FIGS. 20 and 21 except the AMR is replaced by an exemplary gantry 440' configured to move rack 280 along the floor to portal 612 or for buffering. It is noted that gantry 440' is shown configured to access 2 racks and 2 portals; in alternate aspects gantry 440' may be configured to access more or less racks and portals. Referring also to FIGS. 24 and 25 there are shown isometric and top views, respectively, of an exemplary dispense configuration, in accordance with some embodiments. The embodiment shown in FIGS. 24 and 25 is similar to that shown in FIGS. 20 and 21 except the AMR is replaced by a towline 710 configured to move rack 280' having towline engagement pin 712 along the floor to any of portals 612 or for buffering. Referring now to FIGS. 26 and 27 there are shown isometric and top views, respectively, of an exemplary dispense configuration, in accordance with some embodiments. In the embodiment shown gantry 440 delivers cassettes 424 of totes for associate access such that the totes or contents in them may be placed in locker(s) 632 for removal by a customer or associate. Referring now to FIGS. 28 and 29 there are shown isometric and top views, respectively, of an exemplary dispense configuration, in accordance with some embodiments. In the embodiment shown Bots in storage structure 102 deliver totes directly to accumulating conveyors 780 where associates deliver the totes or contents in them to locker(s) 632 for removal by a customer or associate. Referring now to FIGS. 30 and 31 there are shown isometric and top views, respectively, of an exemplary dispense configuration, in accordance with some embodiments. In the embodiment shown Bots in storage structure 102 deliver totes to paternoster buffer 340 where associates deliver the totes or contents of a given order to shopping cart 364 accessible by associates or customers through portal 612 for removal by a customer or associate. Note that staging area 810 may be provided for items not picked from the ASRS, such as oversize or floor picked items. When loading carts 364 such items can easily be added to cart 364. Referring now to FIG. 32 there is shown isometric view of an exemplary dispense configuration, in accordance with some embodiments. Here, shopping carts 364 are loaded with the contents of totes and bulky items from cart or rack 280 and presented to the customer or associate through portal 612. Referring now to FIG. 33 there is shown isometric view of an exemplary dispense configuration, in accordance with some embodiments. Here, the contents of racks 280 are loaded into lockers 632 and presented to the customer or associate through lockers 632. Referring now to FIG. 34 there is shown isometric view of an exemplary dispense configuration, in accordance with some embodiments. In the configuration shown, shopping carts 364 are loaded from the tote contents of accumulation conveyor 780 and transported through portal 612 via towline, AMR or otherwise automatically or semi-automatically to be presented to the customer for customer or associate unloading and subsequent return through portal 612. Referring now to FIG. 35 there is shown isometric view of an exemplary dispense configuration, in accordance with some embodiments. In the configuration shown, shopping carts 364 are loaded from the tote contents of paternoster 340 and transported through portal 612 via towline, AMR or otherwise automatically or semi-automatically to be presented to the customer for customer or associate unloading and subsequent return through portal 612. The foregoing exemplary dispense configurations are merely exemplary and accordingly any suitable combination of systems and subsystems may be provided.

In accordance with an example embodiment a non-transitory program storage device readable by a machine may be provided, such as memory, for example, tangibly embodying a program of instructions executable by the machine for performing operations, the operations comprising: calculating routing of mobile robots and totes to stage and sequence mobile robots and totes as disclosed through fulfillment facility 100.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Some embodiments provide order fulfillment systems configured to fulfill orders for goods. The order fulfillment system can comprise: a storage structure, mobile robots, a plurality of workstations, and a dispense portal. The storage structure can comprise: multiple storage levels vertically separated and a number of bays each comprising an array of storage locations configured to store totes, wherein pairs of bays are each positioned facing each other and separated by a respective aisle of multiple aisles of the storage structure. The mobile robots can be configured to move along the multiple aisles and transport the totes through the storage structure. The plurality of workstations can be configured to receive totes from the storage structure via the mobile robots and present the received totes enabling items to be retrieved from the totes in consolidating at least one item for each of multiple different product orders in fulfilling the multiple product orders. The dispense portal can be positioned appurtenant to a retrieving area and be configured to receive a first fulfilled product order, of the multiple product orders, comprising the at least one item, and configured to provide access to the at least one item of the first fulfilled product order from the first dispense portal to the receiving area.

The order fulfillment system, in some implementations, further comprises a movable cart configured to be temporarily positioned at a first workstation of the plurality of workstations, receive the at least one item in fulfilling the first fulfilled product order and transported between the first workstation and the first dispense portal to await access and retrieval of the at least one item through the first dispense portal. The dispense portal can comprise a door configured to remain closed until authorized access is received, and opened while the at least one item of the first fulfilled product order is positioned at the first dispense portal exposing the cart containing the at least one item of the fulfilled product order. The retrieving area can comprise a customer pickup location comprising a parking space adjacent the first dispense portal to temporarily receive a vehicle of a first customer as the first customer retrieves at least one item of the first fulfilled product order from the first dispense portal. Some embodiments further comprise movable carts each configured to be: temporarily positioned at one of the plurality of workstations, receive the at least one item in fulfilling the multiple different product order, and sequentially transported between the respective one of the plurality of workstations and a respective one of a series of dispense portals, comprising the first dispense portal. A series of adjacent dispense portals can be included in some embodiments. Each of the dispense portals can be configured to receive multiple different fulfilled product orders each positioned within a respective one of the series of dispense portals to await direct retrieval by different customers associated with a respective one of the multiple fulfilled product orders. A first mobile robot of the mobile robots can transport a fulfilled product order to the dispense portal.

Some embodiments comprise a gantry system positioned proximate the dispense portal and configured to transports one or more fulfilled product orders between a workstation, of the plurality of workstations, and the dispense portal. The gantry system, in some embodiments, can be configured to transport each of the multiple fulfilled product orders of the multiple different product orders between the plurality of workstations and an assigned one of the series of dispense portals. The storage structure and plurality of workstations can be spaced from each other and the mobile robots travel between the storage structure and the plurality of workstations transporting the totes. In some embodiments, the order fulfillment system further comprises a buffering station configured to receive totes from the storage structure via the mobile robots and configured to load totes into a rack, wherein the buffering station is positioned at the first dispense portal. The buffering station can comprise a climate control section configured to receive and house totes having climate sensitive goods. A dispense portal can comprise lockers for storing totes containing multiple fulfilled product orders.

In some embodiments, methods of fulfilling orders for goods are provided comprising: directing mobile robots, each configured to move vertically and horizontally along aisles within a storage structure comprising multiple storage levels vertically separated and having a number of bays each comprising an array of storage locations configured to store totes with pairs of bays positioned facing each other and each separated by a respective aisle of the aisles, to retrieve the totes from the storage locations; directing the mobile robots, while transporting a respective one of the totes, to one of a plurality of workstations each configured to receive the totes from the storage structure via the mobile robots and present the received totes enabling items to be retrieved from the totes in consolidating at least one item for each of multiple different product orders in fulfilling the multiple product orders; causing a first fulfilled product order, of the multiple product orders, comprising the at least one item, to be transferred to a first dispense portal appurtenant to a retrieving area; and receiving, at the first dispense portal, the first fulfilled product order and providing access, through the first dispense portal, to the at least one item of the first fulfilled product order from to the receiving area. The method, in some embodiments, can further comprise: temporarily positioning a movable cart at a first workstation of the plurality of workstations; directing the at least one item to be placed into the movable cart in fulfilling the first fulfilled product order; and causing the movable cart, with the at least one item, to be transported between the first workstation and the first dispense portal to await access and retrieval of the at least one item through the first dispense portal.

Some embodiments further control a door of the first dispense portal to remain closed until authorized access is received, and control the door to open while the at least one item of the first fulfilled product order is positioned at the first dispense portal exposing the movable cart containing the at least one item of the fulfilled product order. In some embodiments, the method comprises: causing multiple fulfilled product orders to be transported from the plurality of workstations to a respective one of a series of adjacent dispense portals, comprising the first dispense portal, each configured to receive one or more of the multiple fulfilled product orders positioned within a respective one of the series of adjacent dispense portals to await direct retrieval by different customers associated with a respective one of the multiple fulfilled product orders. In transporting the product orders from the plurality of workstations to the respective one of the series of adjacent dispense portals, some embodiments comprise directing a first mobile robot of the mobile robots to transport the first fulfilled product order to the first dispense portal. Causing transport of the multiple fulfilled product orders from the plurality of workstations to the respective one of the series of adjacent dispense portals can comprise controlling a gantry system positioned proximate the first dispense portal to transport the first fulfilled product order between a first workstation and the first dispense portal.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

What is claimed is:

1. An order fulfillment system, the order fulfillment system comprising:

a storage structure comprising: multiple storage levels vertically separated and a number of bays each comprising an array of storage locations configured to store totes, wherein pairs of bays are each positioned facing each other and separated by a respective aisle of multiple aisles of the storage structure;

mobile robots configured to move along the multiple aisles and transport the totes through the storage structure;

a plurality of workstations configured to receive totes from the storage structure via the mobile robots and present the received totes enabling items to be retrieved from the totes in consolidating at least one item for each of multiple different product orders in fulfilling the multiple product orders; and a first dispense portal appurtenant to a retrieving area, the first dispense portal configured to receive a first fulfilled product order, of the multiple product orders, comprising the at least one item, and configured to provide access to the at least one item of the first fulfilled product order from the first dispense portal to the receiving area.

2. The order fulfillment system as recited in claim 1, further comprising a movable cart configured to be temporarily positioned at a first workstation of the plurality of workstations, receive the at least one item in fulfilling the first fulfilled product order and transported between the first workstation and the first dispense portal to await access and retrieval of the at least one item through the first dispense portal.

3. The order fulfillment system as recited in claim 2, wherein the first dispense portal comprises a door configured to remain closed until authorized access is received, and opened while the at least one item of the first fulfilled product order is positioned at the first dispense portal exposing the cart containing the at least one item of the fulfilled product order.

4. The order fulfillment system as recited in claim 3, wherein the retrieving area comprises a customer pickup location comprising a parking space adjacent the first dispense portal to temporarily receive a vehicle of a first customer as the first customer retrieves at least one item of the first fulfilled product order from the first dispense portal.

5. The order fulfillment system as recited in claim 3, further comprising movable carts each configured to be temporarily positioned at one of the plurality of workstations, receive the at least one item in fulfilling the multiple different product order, and sequentially transported between the respective one of the plurality of workstations and a respective one of a series of dispense portals, comprising the first dispense portal.

6. The order fulfillment system as recited in claim 1, further comprising a series of adjacent dispense portals, comprising the first dispense portal, each configured to receive multiple different fulfilled product orders each positioned within a respective one of the series of dispense portals to await direct retrieval by different customers associated with a respective one of the multiple fulfilled product orders.

7. The order fulfillment system as recited in claim 6, wherein a first mobile robot of the mobile robots transports the first fulfilled product order to the first dispense portal.

8. The order fulfillment system as recited in claim 6, further comprising a gantry system positioned proximate the first dispense portal and configured to transports the first fulfilled product order between a first workstation, of the plurality of workstations, and the first dispense portal.

9. The order fulfillment system as recited in claim 8, wherein the gantry system is configured to transport each of the multiple fulfilled product orders of the multiple different product orders between the plurality of workstations and an assigned one of the series of dispense portals.

10. The order fulfillment system as recited in claim 1, wherein the storage structure and plurality of workstations are spaced from each other and the mobile robots travel between the storage structure and the plurality of workstations transporting the totes.

11. The order fulfillment system as recited in claim 1, further comprising:

a buffering station configured to receive totes from the storage structure via the mobile robots and configured to load totes into a rack, wherein the buffering station is positioned at the first dispense portal.

12. The order fulfillment system as recited in claim 11, wherein the buffering station comprises a climate control section configured to maintain a temperature to house totes having climate sensitive goods.

13. The order fulfillment system as recited in claim 1, wherein the first dispense portal comprises lockers configured to store totes containing multiple fulfilled product orders.

14. A method of fulfilling orders for goods comprising:

directing mobile robots, each configured to move vertically and horizontally along aisles within a storage structure comprising multiple storage levels vertically separated and having a number of bays each comprising an array of storage locations configured to store totes with pairs of bays positioned facing each other and each separated by a respective aisle of the aisles, to retrieve the totes from the storage locations;

directing the mobile robots, while transporting a respective one of the totes, to one of a plurality of workstations each configured to receive the totes from the storage structure via the mobile robots and present the received totes enabling items to be retrieved from the totes in consolidating at least one item for each of multiple different product orders in fulfilling the multiple product orders;

causing a first fulfilled product order, of the multiple product orders, comprising the at least one item, to be transferred to a first dispense portal appurtenant to a retrieving area; and receiving, at the first dispense portal, the first fulfilled product order and providing access, through the first dispense portal, to the at least one item of the first fulfilled product order from to the receiving area.

15. The method of claim 14, further comprising:

temporarily positioning a movable cart at a first workstation of the plurality of workstations;

directing the at least one item to be placed into the movable cart in fulfilling the first fulfilled product order; and causing the movable cart, with the at least one item, to be transported between the first workstation and the first dispense portal to await access and retrieval of the at least one item through the first dispense portal.

16. The method of claim 15, further comprising:

controlling a door of the first dispense portal to remain closed until authorized access is received; and controlling the door to open while the at least one item of the first fulfilled product order is positioned at the first dispense portal exposing the movable cart containing the at least one item of the fulfilled product order.

17. The method of claim 14, further comprising:

causing multiple fulfilled product orders to be transported from the plurality of workstations to a respective one of a series of adjacent dispense portals, comprising the first dispense portal, each configured to receive one or more of the multiple fulfilled product orders positioned within a respective one of the series of adjacent dispense portals to await direct retrieval by different customers associated with a respective one of the multiple fulfilled product orders.

18. The method of claim 17, wherein causing multiple fulfilled product orders to be transported from the plurality of workstations to the respective one of the series of adjacent dispense portals comprises directing a first mobile robot of the mobile robots to transport the first fulfilled product order to the first dispense portal.

19. The method of claim 17, wherein causing multiple fulfilled product orders to be transported from the plurality of workstations to the respective one of the series of adjacent dispense portals comprises controlling a gantry system positioned proximate the first dispense portal to transport the first fulfilled product order between a first workstation and the first dispense portal.

* * * * *